US008389846B2

(12) United States Patent
Muramatsu

(10) Patent No.: US 8,389,846 B2
(45) Date of Patent: Mar. 5, 2013

(54) INNER FORCE SENSE CONTROLLING APPARATUS, METHOD FOR CONTROLLING INNER FORCE SENSE AND MUSICAL INSTRUMENT USING THE SAME

(75) Inventor: Shigeru Muramatsu, Mori-machi (JP)

(73) Assignee: Yamaha Corporation, Hamamatsu (JP)

( * ) Notice: Subject to any disclaimer, the term of this patent is extended or adjusted under 35 U.S.C. 154(b) by 726 days.

(21) Appl. No.: 12/168,794

(22) Filed: Jul. 7, 2008

(65) Prior Publication Data

US 2009/0019997 A1 Jan. 22, 2009

(30) Foreign Application Priority Data

Jul. 18, 2007 (JP) ................................ 2007-187516

(51) Int. Cl.
*G01P 3/00* (2006.01)

(52) U.S. Cl. ........................................................ 84/626

(58) Field of Classification Search .................... 84/439, 84/626, 744–746

See application file for complete search history.

(56) References Cited

U.S. PATENT DOCUMENTS 4,899,631 A 2/1990 Baker
5,131,306 A 7/1992 Yamamoto
5,783,765 A * 7/1998 Muramatsu ..................... 84/615
5,922,983 A 7/1999 Muramatsu
5,952,806 A 9/1999 Muramatsu
6,121,535 A 9/2000 Muramatsu
2005/0204906 A1 9/2005 Lengeling
2006/0090633 A1 5/2006 Muramatsu

FOREIGN PATENT DOCUMENTS

JP 04-204697 7/1992
JP 07-168571 7/1995
JP 10-020857 1/1998
JP 10-161652 6/1998
JP 10-177378 6/1998
JP 10-198349 7/1998
JP 10-240257 9/1998
JP 10-282954 10/1998
JP 11-282471 10/1999

* cited by examiner

*Primary Examiner* — Jianchun Qin

(74) *Attorney, Agent, or Firm* — Harness, Dickey & Pierce, P.L.C.

(57) ABSTRACT

An electronic keyboard musical instrument has a load applier, which gives rise to inner force sense equivalent to another musical instrument such as a piano in the player through black keys and white keys, and the load applier has a mechanical load applier applying a part of load to the keys and an electromechanical load applier applying a remaining part of load to the keys so that the manufacturer can reduce the actuator in size.

14 Claims, 16 Drawing Sheets

INNER FORCE SENSE CONTROLLING APPARATUS, METHOD FOR CONTROLLING INNER FORCE SENSE AND MUSICAL INSTRUMENT USING THE SAME

FIELD OF THE INVENTION

This invention relates to an inner force sense controlling apparatus and, more particularly, to an inner force sense controlling apparatus for a musical instrument, a method for controlling inner force sense and a musical instrument equipped with the inner force sense controlling apparatus.

DESCRIPTION OF THE RELATED ART

A typical example of the inner force sense controlling apparatus is disclosed in Japan Patent Application laid-open No. Hei 10-177378. The prior art inner force sense controlling apparatus is developed for an electronic keyboard, and aims at providing piano key touch, i.e., inner force sense on the keys of an acoustic piano to players. When a player depresses and releases the key of acoustic piano, various phenomena sequentially take place, and reaction to the finger is complicatedly varied through the phenomena. The phenomena are the deformation of hammer actions, collision between the hammer actions and the hammers and capture of hammers by the hammer back checks. Those phenomena are taken into account for the prior art inner force sense controlling apparatus, and the player feels the inner force sense on the keys of electronic keyboard close to the piano key touch.

However, a problem is encountered in the prior art inner force sense controlling apparatus in that large-sized solenoid units are required for the inner force sense close to the piano key touch. In detail, a large amount of reaction force is to be exerted on the depressed key immediately after the initiation of depressing due to the large acceleration. The large-sized solenoid-units are expensive, and make the production cost increased.

SUMMARY OF THE INVENTION

It is therefore an important object of the present invention to provide an inner force sense controlling apparatus, which is relatively low in production cost.

It is another important object of the present invention to provide a method for controlling the inner force sense which is employed in the inner force sense controlling apparatus.

It is also an important object of the present invention to provide a musical instrument, which is equipped with the inner force sense controlling apparatus.

To accomplish the objects, the present invention proposes to apply load partially through a first load applier and partially through a second load applier.

In accordance with one aspect of the present invention, there is provided an inner force sense controlling apparatus for giving rise to inner force sense to a player through manipulators of a musical instrument comprising a first load applier including a kinematical observer monitoring the manipulators and determining physical quantity expressing the movements of the manipulators, actuators respectively provided in association with the manipulators and responsive to driving signals representative of the amount of load to be applied to the associated manipulators so as give rise to a part of the inner force sense in the player, a data holder storing relations between the physical quantity and the amount of the load to be applied to the manipulators and a controller having a selector connected to the kinematical observer and the data holder so as to specify the amount of the load to be applied on the basis of the physical quantity and a driver connected to the selector and the actuators so as to adjust the driving signals to values of magnitude corresponding to the load, and a second load applier connected to the manipulators and applying load to the manipulators so as to give rise to another part of the inner force sense in the player.

In accordance with another aspect of the present invention, there is provided a musical instrument comprising plural manipulators selectively moved between rest positions and end positions by a player for specifying tones to be produced, and an inner force sense controlling apparatus including a first load applier including a kinematical observer monitoring the manipulators and determining physical quantity expressing the movements of the manipulators, actuators respectively provided in association with the manipulators and responsive to driving signals representative of the amount of load to be applied to the associated manipulators so as give rise to a part of the inner force sense in the player, a data holder storing relations between the physical quantity and the amount of the load to be applied to the manipulators and a controller having a selector connected to the kinematical observer and the data holder so as to specify the amount of the load to be applied on the basis of the physical quantity and a driver connected to the selector and the actuators so as to adjust the driving signals to values of magnitude corresponding to the load and a second load applier connected to the manipulators and applying load to the manipulators so as to give rise to another part of the inner force sense in the player.

In accordance with yet another aspect of the present invention, there is provided a method for giving rise to inner force sense to a player through manipulators of a musical instrument comprising the steps of a) determining physical quantity expressing a movement of at least one of the manipulators, b) determining the amount of load to be applied to the aforesaid at least one of the manipulators at the physical quantity, c) adjusting a driving signal to a value of magnitude corresponding to the load to be applied, and d) supplying the driving signal to an actuator associated with the aforesaid at least one of the manipulators so that the actuator gives rise to the inner force sense in the player through a load applier together with another load applier already activated before the step a).

BRIEF DESCRIPTION OF THE DRAWINGS

The features and advantages of the inner force sense controlling apparatus, method and musical instrument will be more clearly understood from the following description taken in conjunction with the accompanying drawings, in which.

DESCRIPTION OF THE PREFERRED EMBODIMENTS

Figure 1:
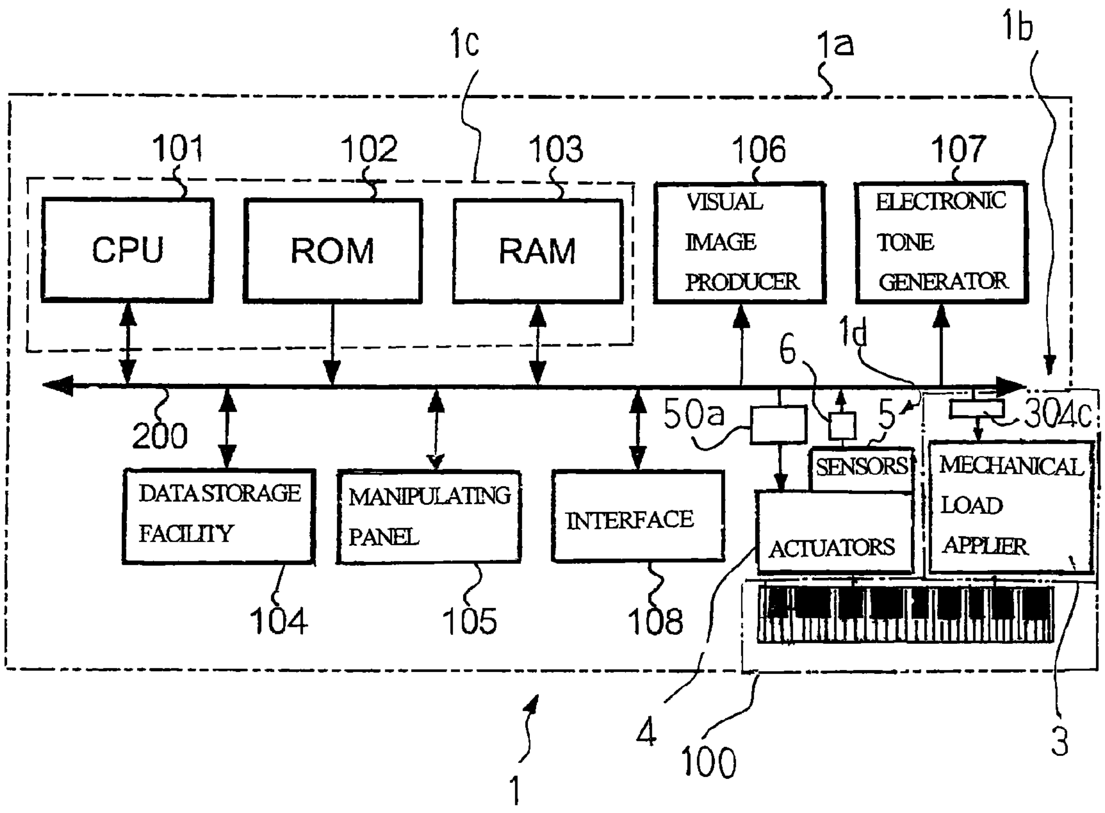
FIG. 1 is a block diagram showing the system configuration of an electronic system incorporated in a keyboard musical instrument of the present invention.

An inner force sense controlling apparatus embodying the present invention is installed in a musical instrument, which has plural manipulators, so as to give rise to inner force sense in a player through manipulators.

The inner force sense controlling apparatus largely comprises a first load applier and a second load applier. The first load applier cooperates with the second load applier so as to give rise to the inner force sense in the player. Thus, the load is shared between the first load applier and the second load applier so that the second load applier permits a designer to reduce a part of load applied by means of the first load applier.

In detail, the first load applier includes a kinematical observer, actuators, a data holder and a controller, and the controller has a selector and a driver. A player selectively moves the manipulators so as to perform a music tune. The actuators are provided in association with the manipulators, and apply load to the manipulators against the movements of manipulators. Relations between the physical quantity and the amount of load to be applied are stored in the data holder. The selector is connected to the kinematical observer and the data holder, and the driver is connected to the selector and the actuators.

The kinematical observer monitors the manipulators, and determines physical quantity expressing the movements of the manipulators. The controller drives the actuators with driving signals for applying the load against the movements of manipulators, whereby the first load applier gives rise to a part of inner force sense in the player during the movements of manipulators. For this reason, the controller is expected to determine the amount of load at the given physical quantity and to adjust the driving signals to the amount of the part of load to be applied to the manipulators by means of the actuators.

When the player moves the manipulators, the kinematical observer informs the selector of the physical quantity, and the selector specifies the amount of the load to be applied on the basis of the physical quantity. The selector informs the driver of the amount of load to be applied to the manipulators by means of the actuators. Then, the driver adjusts the driving signals to values of magnitude corresponding to the load informed by the selector. The driving signals are supplied from the driver to the actuators so as to make the actuators apply the load to the moved manipulators. Thus, the first load applier requires the actuators for the inner force sense. However, the second load applier bears the part of inner force sense. As a result, the first load applier is not expected to apply the all amount of load to the manipulators. This results in the reduction in size of the actuators.

As will be understood from the foregoing description, the inner force sense controlling apparatus controls the load to be applied to the manipulators through a method, which comprises the steps of determining physical quantity expressing a movement of at least one of the manipulators, determining the amount of load to be applied to the aforesaid at least one of the manipulators at the physical quantity, adjusting a driving signal to a value of magnitude corresponding to the load to be applied, and supplying the driving signal to an actuator associated with the aforesaid at least one of the manipulators so that the actuator gives rise to the inner force sense in the player together with another load applier already activated before the step a).

In the following description, term “front” is indicative of a position closer to a player, who is sitting on a stool for performance on a keyboard musical instrument, than a position modified with term “rear”. A line drawn between a front position and a corresponding rear position extends in a longitudinal direction, and a lateral direction crosses the longitudinal direction at right angle. “Up-and-down direction” is normal to a plane defined by the longitudinal direction and lateral direction.

First Embodiment

Electronic System

Referring first to FIG. 1 of the drawings, a keyboard musical instrument 1 embodying the present invention largely comprises an electronic system 1*a*, a load applier 1*b* and a keyboard unit 100. The keyboard musical instrument 1 is known as an electronic piano. The electronic system 1*a* is combined with the keyboard unit 100, and processes pieces of performance data and pieces of charge data, which a player gives to the electronic system 1*a* through the keyboard unit 100. The pieces of performance data express electronic tones to be produced, and the electronic system 1*a* produces the electronic tones through the data processing on the pieces of performance data. The pieces of charge data express physical quantity, which stands for the movements in the keyboard unit 100, and the electronic system 1*a* cooperates with the load applier 1*b* so as to give inner force sense to the player.

The electronic system 1*a* includes an information processing system 1*c*, small-sized solenoid-operated actuators 4, sensors 5, logic circuits 6, a solenoid driver 50*a*, a data storage facility 104, a manipulating panel 105, a visual image producer 106, an electronic tone generator 107 and an interface 108. The information processing system 1*c*, logic circuits 6, solenoid driver 50*a*, data storage facility 104, manipulating panel 105, visual image producer 106, electronic tone generator 107 and interface 108 are connected to a shared bus system 200 so that various digital signals are transferred between the information processing system 1*c* and the other system components 4, 5, 6, 50*a*, 104, 105, 106, 107 and 108. The small-sized solenoid-operated actuators 4 and sensors 5 are respectively connected to the solenoid driver 50*a* and logic circuits 6.

The information processing system 1*c* is an origin of information processing capability, and includes a central processing unit, which is abbreviated as “CPU”, peripheral processors (not shown), a read only memory 102, which is abbreviated as “ROM”, and a random access memory 103, which is abbreviated as "RAM". The central processing unit 101 is responsive to instruction codes, and carries out arithmetic operations and logical operations. The read only memory 102 mainly serves as a program memory, and a computer program is stored in the read only memory 102. The random access memory 103 serves as a working memory, and pieces of data are temporarily stored in the random access memory 103.

The computer program is broken down into a main routine program and subroutine programs. While the main routine program is running on the central processing unit 101, users are communicable with the electronic system 1*a* through the manipulating panel 105 and visual image producer 106.

One of the subroutine programs is prepared for generation of electronic tones. While the central processing unit 101 is reiterating the subroutine program for generation of electronic tones, the pieces of performance data, which express movements of the keys 2*a* and 2*b*, are analyzed, and music data codes, which express the electronic tones to be generated, are produced on the basis of the pieces of performance data. The music data codes are transferred to the electronic tone generator 107, and the electronic tones are generated through the electronic tone generator 107.

Another of subroutine programs is prepared for measuring lapse of time. Yet another subroutine program is prepared for inner force sense, and will be hereinlater described in detail.

The information processing system 1*c*, small-sized solenoid-operated actuators 4, logic circuits 6, solenoid driver 50*a* and sensors 5 serve as an electromechanical load applier 1*d*, which form a part of the load applier 1*b*. The electromechanical load applier 1*d* gives rise to part of inner force sense in the player through the keyboard unit 100. A mechanical load applier 3 forms another part of the load applier 1*b*, and gives rise to part of inner force sense. Thus, the electromechanical load applier 1*d* cooperates with the mechanical load applier 3 so as to give rise to complete inner force sense in the player.

The small-sized solenoid-operated actuators 4 and sensors 5 are hereinlater described in detail in conjunction with the load applier 1*b*.

The data storage facility 104 has a large amount of data holding capacity, and is implemented by a hard disk drive unit. Plural sets of pieces of inner force sense data, pieces of load applier control data and a set of pieces of load application data are stored in the data storage facility 104 together with music files. While the subroutine program for generation of inner force sense is running on the central processing unit 101, the central processing unit 101 determines the magnitude of inertial load to be exerted with reference to the pieces of load application data, pieces of inner force sense data and pieces of load applier control data. The set of pieces of load application data, plural sets of pieces of inner force sense data and pieces of load applier control data will be hereinlater described in detail. Plural sets of music data codes are respectively stored in the music files, and each set of music data codes express a music tune, and the music tunes are prepared for playback through the electronic tone generator 107.

The manipulating panel 105 forms a part of a man-machine interface, and includes button switches, keys and a mouse. While the main routine program is running on the central processing unit 101, the central processing unit 101 periodically checks the manipulating panel 105 to see what button switch or key the user depresses and where the user clicks the mouse, and determines user's intention on the basis of the depressed button switches, depressed keys and clicked location.

The visual image producer 106 is implemented by a liquid crystal display panel 106*a*, a display driver 106*b* and a digital-to-analog converter 45 (see FIG. 5), and forms another part of the man-machine interface. The display driver produces various sorts of symbolic images, character images and an image of cursor on the liquid crystal display panel 106*a*. The visual display producer 106 offers a job menu, various lists and other menus through the symbolic images and character images, and informs the user of present status of the electronic keyboard 1. One of the current status is the amount of inertial load, which is applied to the keys 2*a* and 2*b* through the electromechanical load applier 1*d*. The amount of inertial load is varied with time, and an image of waveform, which expresses the amount of inertial load, is produced on the liquid crystal display 106*a*. The display driver 106*b* changes the location of the image of cursor on the liquid crystal display panel 106*a* depending upon the movements on the mouse, and makes it possible that the user expresses his or her intentions by clicking on certain images. Several symbolic images express different tone colors to be imparted to the electronic tones.

The electronic tone generator 107 includes a tone generator and a sound system. The tone generator produces an audio signal on the basis of the music data codes, and the audio signal is converted to the electronic tones through the sound system. In case where the user has already selected a certain tone color from the list of tone colors, the certain tone color is imparted to the electronic tones.

The interface 108 includes key switches, a signal interface and a communication interface. The key switches are connected to the black keys 2*a* and white keys 2*b*. While the subroutine program for the generation of electronic tones is running on the central processing unit 101, the central processing unit 101 periodically checks the key switches to see whether or not the player depresses and releases any one of or any ones of the black keys 2*a* and white keys 2*b*. When the central processing unit 101 finds the depressed key or keys 2*a*/2*b*, the central processing unit 101 produces the music data code or codes expressing the note-on message defined in the MIDI (Musical Instrument Digital Interface) protocols, and the note-on music data code or codes are transferred to the electronic tone generator 107. On the other hand, when the central processing unit 101 finds the released key or keys, the central processing unit produces the music data code or codes expressing the note-off message, and the note-off music data code or codes are transferred to the electronic tone generator 107. The signal interface is connectable with another electronic musical instrument through a cable, and the music data codes are supplied from and to the electronic musical instrument. The communication interface is connected to the internet and a personal computer system through a cable or a radio channel, and the computer program and music data files are downloaded from the program source and data sources.

Keyboard Unit

Figure 2:
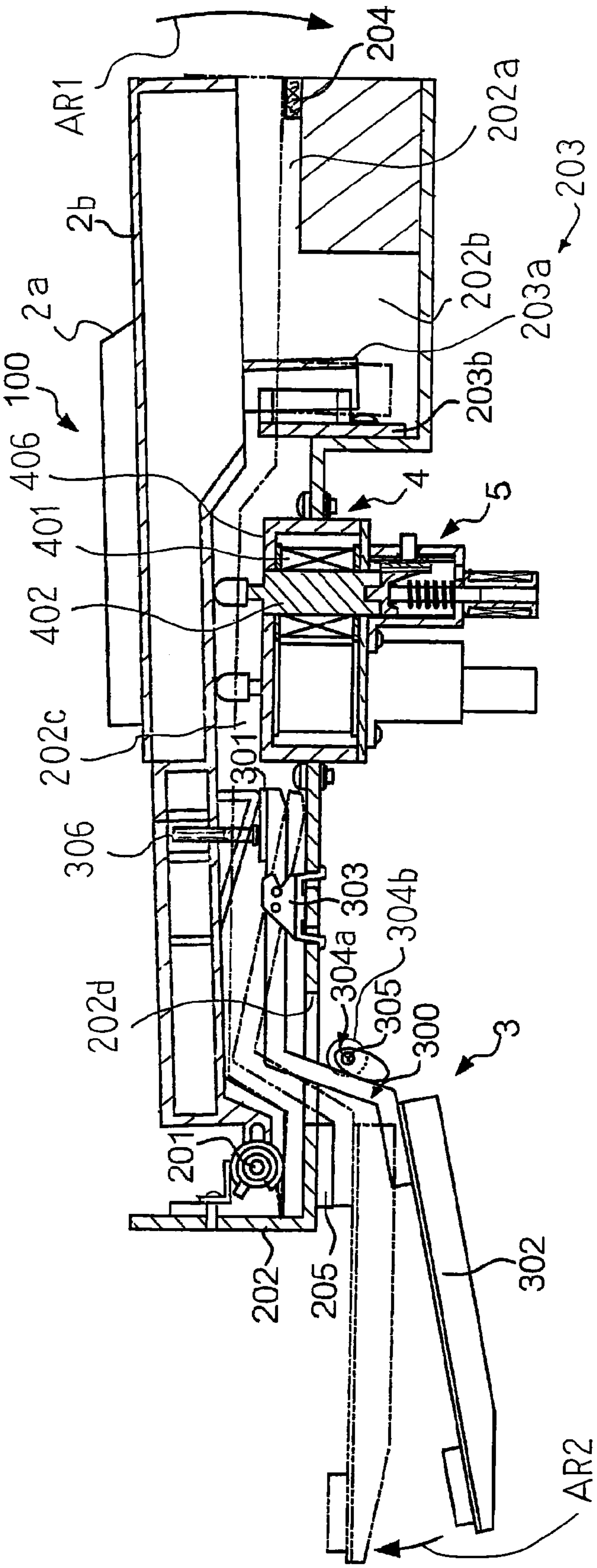
FIG. 2 is a cross sectional side view showing a keyboard unit of the keyboard musical instrument.
Figure 3:
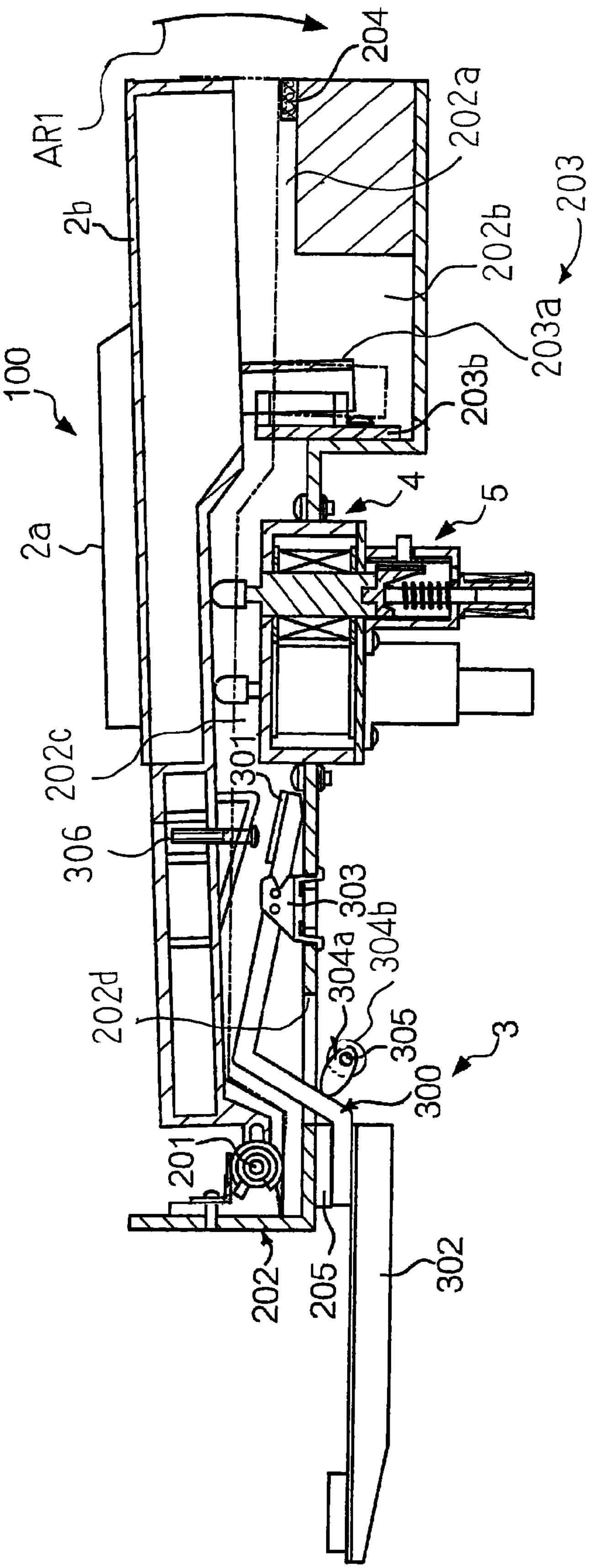
FIG. 3 is a cross sectional side view showing the keyboard unit of the keyboard musical instrument.

Turning to FIGS. 2 and 3, the keyboard unit 100 includes black keys 2*a*, white keys 2*b*, a supporting structure 201, a cabinet 202, a stroke guide 203 and a key stopper 204. A hollow space is defined in the cabinet 202, and the black keys 2*a*, white keys 2*b*, supporting structure 201, stroke guide 203 and keys stopper 204 are accommodated in the hollow space.

The hollow space is open to the environment through an upper opening, and has a front shallow recess 202*a*, an intermediate deep recess 202*b* and a rear shallow recess 202*c*. The supporting structure 201 is provided inside the rear shallow recess 202*c*, and is secured to the rear end portion of the cabinet 202. The supporting structure 201 offers an axis of rotation to the black keys 2*a* and white keys 2*b*. The black keys 2a and white keys 2b have rear end portions, which are rotatably connected to the supporting structure 201. Thus, the black keys 2a and white keys 2b is rotatable about the supporting structure 201 in the direction indicated by an arrow AR1 and vice versa. While the player is depressing the front portions of black keys 2a and the front portions of white keys 2b, the black keys 2a and white keys 2b travel on loci between rest positions and end positions, respectively.

The key stopper 204 laterally extends on the bottom of front shallow recess 202a, and sets a limit to the black keys 2a and white keys 2b. When the black keys 2a and white keys 2b reaches the key stopper 204, the black keys 2a and white keys 2b have respective upper surfaces substantially coplanar with the upper periphery of the cabinet 202.

The stroke guide 203 has projections 203a and a guide structure 203b. The projections 203a are respectively secured to the keys 2a and 2b. The guide structure 203b is provided in the intermediate deep recess 202b, and is secured to the cabinet 202. The guide structure 203b is formed with guide grooves, and the projections 203a are movable in the guide grooves, respectively. While the black keys 2a and white keys 2b are rotating in the direction of allow AR1, the projections 203a downwardly slide on the inner surfaces of the guide structure 203b so as to prevent the black keys 2a and white keys 2b from sideward fluctuation.

The bottom portion of cabinet 202 is formed with a slot, which laterally extends below the black keys 2a and white keys 2b, and the array of small-sized solenoid-operated actuators 4 is secured to the cabinet 202 in such a manner as to be exposed to the rear shallow recess 202c. The sensors 5 are respectively associated with the small-sized solenoid-operated actuators 4, and are connected to the lower portions of small-sized solenoid-operated actuators 4.

Load Applier

Figure 4:
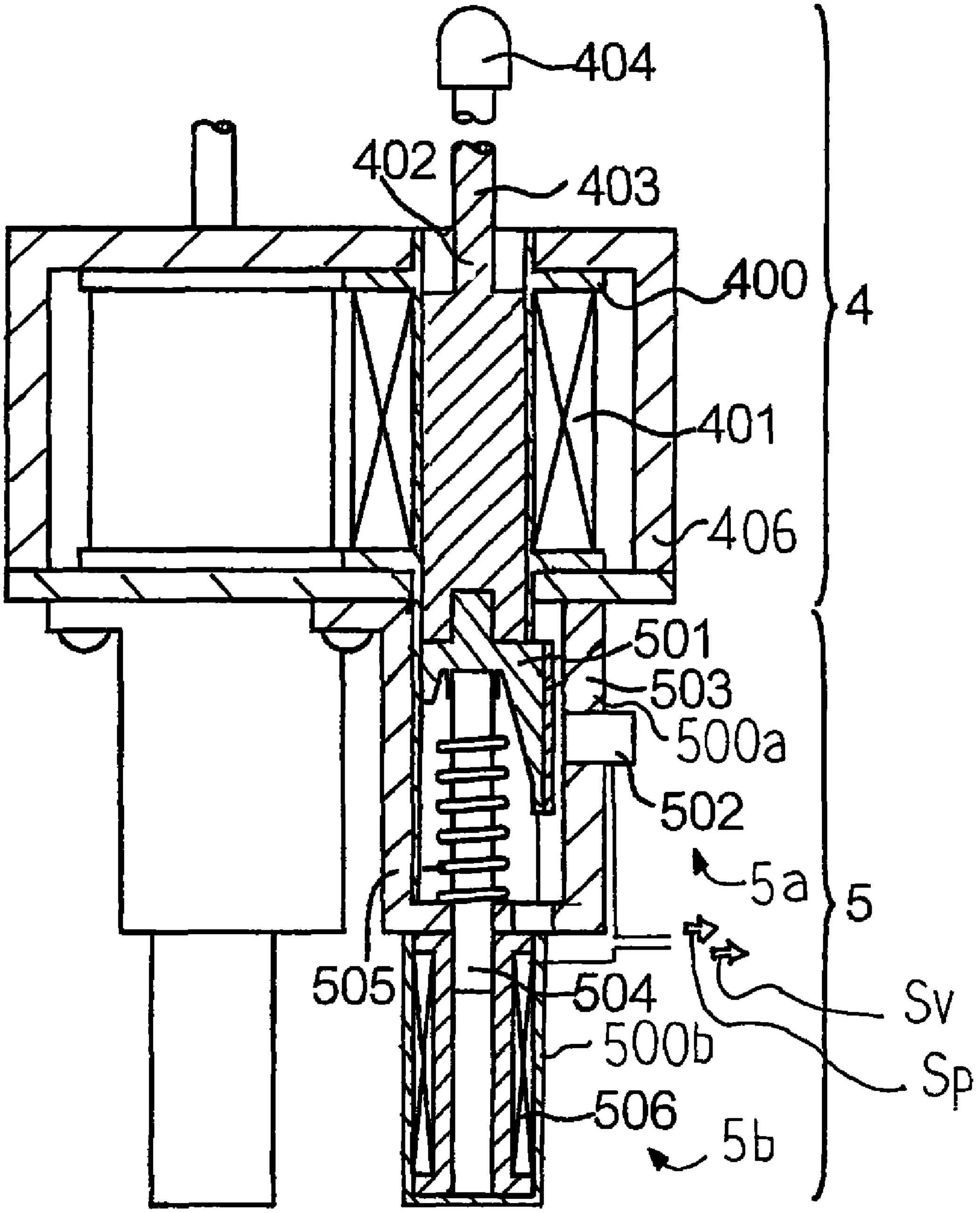
FIG. 4 is a cross sectional side view showing the structure of a solenoid-operated actuator and the structure of a sensor.

FIG. 4 illustrates the structure of small-sized solenoid-operated actuators 4 and the structure of sensors 5. The small-sized solenoid-operated actuator 4 includes a yoke 400, a coil 401, a plunger 402, a rod 403, a head 404 and a housing 406. The housing 406 is shared among the small-sized solenoid-operated actuators 4, and is bolted to the cabinet 202 as shown in FIGS. 2 and 3. An inner space is defined in the housing 406, and the yoke 400 is accommodated in the inner space of housing 408. The coil 401 is mound on the yoke 400, and is connected to the solenoid driver 50a through a suitable cable. An inner space is defined in the coil 401, and the coil 401 has a center axis, which extends through the inner space in the up-and-down direction. A pair of through-holes is formed in the housing 406 over and below the coil 401. The plunger 402 passes through the through-holes and the inner space of coil 401. The rod 403 upwardly extends from the upper surface of the plunger 402, and has a center axis aligned with the center axis of plunger 402. The head 404 is secured to the upper end of the rod 403, and is in close proximity of the lower surface of associated black key 2a or the lower surface of associated white key 2b.

While any current is not flowing through the coil 401, the plunger 402 is retracted into the coil 401, and does not upwardly push the associated key 2a or 2b. The position of plunger 402 without any electromagnetic force is hereinafter referred to as “rest position”, and the plunger stroke is the difference between the rest position and a current position.

When the current flows through the coil 401, magnetic field is created around the coil 401, and the electromagnetic force is exerted on the plunger 402 in the upward direction. As a result, the plunger 402, rod 403 and head 404 upwardly projects from the housing 406 so as to exert force on the lower surface of associated key 2a or 2b. The player feels the force resistance against the downward movement of the associated key 2a or 2b. Thus, the small-sized solenoid-operated actuator 4 electromechanically gives rise to the load on the associated key 2a or 2b.

Each of the sensors 5 includes a plunger stroke sensor 5a and a plunger velocity sensor 5b. The plunger stroke sensor 5a and plunger velocity sensor 5b directly monitor the movements of associated plunger 402, and indirectly monitor the associated key 2a or 2b through the plunger 402.

The plunger stroke sensor 5a includes a housing 500a, a socket 501, a reflection-type photo coupler 502 and an optical modulator 503. The housing 500a is bolted to the bottom portion of housing 406, and the inner space of housing 406 is continuous to an inner space is defined in the housing 500a. While the plunger 403 is being retracted into the coil 401, the lower portion of plunger 402 is found in the inner space of housing 500a. The socket 501 is connected to the lower portion of plunger 402, and the optical modulator 503 is secured to the side surface of the socket 501. For this reason, the optical modulator 503 is moved along the center axis of plunger 402 together with the plunger 402 and socket 501.

A through-hole is formed in the housing 500a, and the reflection-type photo coupler 502 is inserted into the through-hole. The reflection type photo coupler 502 radiates a light beam in the direction perpendicular to the center axis of plunger 402, and the light beam is fallen onto the optical modulator 503. The optical modulator 503 has the reflectivity varied in the up-and-down direction. In this instance, the closer to the plunger 402 the area on the optical modulator is, the smaller the reflectivity is. In other words, the reflectivity is gradually reduced from the upper end of optical modulator 503 to the lower end of optical modulator 503. The light beam is incident on the optical modulator 503, and is reflected on the area of optical modulator 503. The reflection returns to the reflection type photo coupler 502, and is converted to photo current. Since the reflectivity is varied along the center axis of plunger 402, the amount of reflection is varied depending upon the reflectivity of area where the light beam is fallen. While the plunger 402 is projecting in the upward direction, the reflectivity of area is increased, and the difference in reflectivity and, accordingly, the different in amount of photo current are varied in dependence on the plunger stroke. The photo current is taken out from the reflection-type photo coupler 502 as a plunger position signal Sp. The keystroke is varied inversely proportional to the plunger stroke. The plunger position signal Sp is supplied to the logic circuits 6.

The plunger velocity sensor 5b is implemented by a moving magnet-type velocity sensor, and includes a housing 500b, a piece of magnet 504 and a coil 506. The housing 500b is secured to the bottom portion of housing 500a, and the piece of magnet 504 and coil 506 are accommodated in the housing 500b. The piece of magnet 504 is connected to the socket 501 through a rod, and has a center axis aligned with the center axis of plunger 402. A coil spring 505 is wound on the rod.

While the plunger 402 is being moved, the piece of magnet 504 is moved together with the plunger 402, and electromagnetically gives rise to current in the coil 506. The induced current is taken out from the coil 506 as a plunger velocity signal Sv, and the plunger velocity signal Sv is supplied to the logic circuits 6.

Turning back to FIGS. 2 and 3, the mechanical load applier 3 is fitted to the cabinet 202, and includes a hammer stopper 205, hammers 300, brackets 303, a cam rod 304a, a stepping motor 304b and regulating screws 306. The hammer stopper 205 is secured to the lower surface of bottom portion of cabinet 202, and extends in the lateral direction. The hammers

300 are brought into contact with and spaced from the hammer stopper 205 depending upon the angular position of the cam rod 304*a* as will be hereinlater described.

The bottom portion of cabinet 202 is further formed with slots 202*d*, and the slots 202*d* are disposed in the lateral direction. The slots 202*d* are formed in areas of the bottom portion respectively below the rear portions of keys 2*a* and 2*b*, and are respectively assigned to the hammers 300. The brackets 303 are respectively provided in front of the slots 202*d*, and are secured to the bottom portion of cabinet 202. Thus, the brackets 303 are respectively provided in the rear shallow recess 202*c* for the hammers 300. The hammers 300 are rotatably supported by the brackets 303, respectively, and respectively have front acting portions 301 in front of the brackets 303 in the rear shallow recess 202*c*. The hammers 300 further have rear load portions 302 at the back of brackets 303, and rearwardly extend under the hammer stopper 205 through the slots 202*d*. Thus, the hammers 300 are rotatable about the brackets 303, and make the front acting portions 301 and rear load portions 302 moved in the rear shallow recess 202*c* and the outside space below the bottom portion of cabinet 202.

The regulating screws 306 are driven into and out of the keys 2*a* and 2*b*, respectively, and the head portions of regulating screws 306 are adjusted to positions where the front load portions 301 are held on contact with the head portions on the condition that the black keys 2*a* and white keys 2*b* are staying at the rest positions.

Each of the rear load portions 302 has a certain value of mass m. When the rear load portion 302 is driven for rotation at a certain value of acceleration a at the center or gravity, the force F, which is given as F=m×a, is exerted on the center of gravity of the rear load portion 302. Since the front acting portion 301 is brought into contact with the rear portion of associated key 2*a* or 2*b* at a certain point, force F', which is inversely proportional to the ratio of length between the front acting portion 301 and the rear load portion 302, is exerted on the rear portion of associated key 2*a* or 2*b* as the load against the key movement. The rear load portions 302 are different in mass. The rear load portions 302 for the keys 2*a* and 2*b* in a lower register are larger in mass than the rear load portions 302 for the keys 2*a* and 2*b* in a higher register are.

The cam rod 304*a* extends in the lateral direction beneath the bottom portion of cabinet 202, and is rotatably supported by the cabinet 202 by means of suitable bearings (not shown). The stepping motor 304*b* is connected to the cam rod 304*a*, and has an output shaft (not shown). The center axis of output shaft is aligned with the center axis 305 of cam rod 304*a*. A pulse generator 304*c* is electrically connected to the stepping motor 304*b* as shown in FIG. 1, and causes the output shaft of stepping motor 304*b* and cam rod 304*a* to be bi-directionally driven for rotation.

The cam rod 304 has an elliptical cross section, and has a minor axis and a major axis on the cross section. The cam rod 304 is held in contact with the rear load portions 302. While the cam rod 304 is being held in contact with the rear load portions 302 at the major axis, the hammer 300 stays at the position indicated by dots-and-dash lines in FIG. 2, and the front acting portion 301 is spaced from the head portions of regulating screws 306 driven into the associated key 2*a* or 2*b* as shown in FIG. 3. In this situation, even though a player depresses the front portions of keys 2*a* and 2*b* as indicated by arrow AR1, the hammers 300 do not offer any resistance against the movements of keys 2*a* and 2*b*. When the black keys 2*a* and white keys 2*b* reach the end positions, the head portions of regulating screws 306 are brought into contact with the front acting portions 301, or are still spaced from the front acting portions 301. Thus, the hammers 300 stand idle in the deactivated position where the cam rod 304*a* is held in contact with the rear load portion 302 at the major axis.

On the other hand, when the pulse generator 304*c* supplies the pulses to the stepping motor 304*b*, the cam rod 304*a* is driven for rotation, and pushes the hammers 300 as indicated by arrow AR2. The pulse generator 304*c* stops the pulses when the cam rod 304 is brought into contact with the hammers 300 at the minor axis. The hammers 300 reach the position drawn by dots-and-dash lines in FIG. 2, the rear load portions 302 are brought into contact with the hammer stopper 205, and the front acting portions 301 are brought into contact with the head portions of regulating screws 306. In this situation, when the player depresses the black keys 2*a* and white keys 2*b*, the black keys 2*a* and white keys 2*b* start to travel on the loci, and the hammers 300 exert the load on the fingers of player through the depressed keys 2*a* and 2*b*. Thus, the hammers 300 get ready to apply the load to the keys 2*a* and 2*b* at the activated position where the cam rod 304*a* is held in contact with the rear load portions 302 at the minor axis.

Behavior of Load Applier

Figure 5:
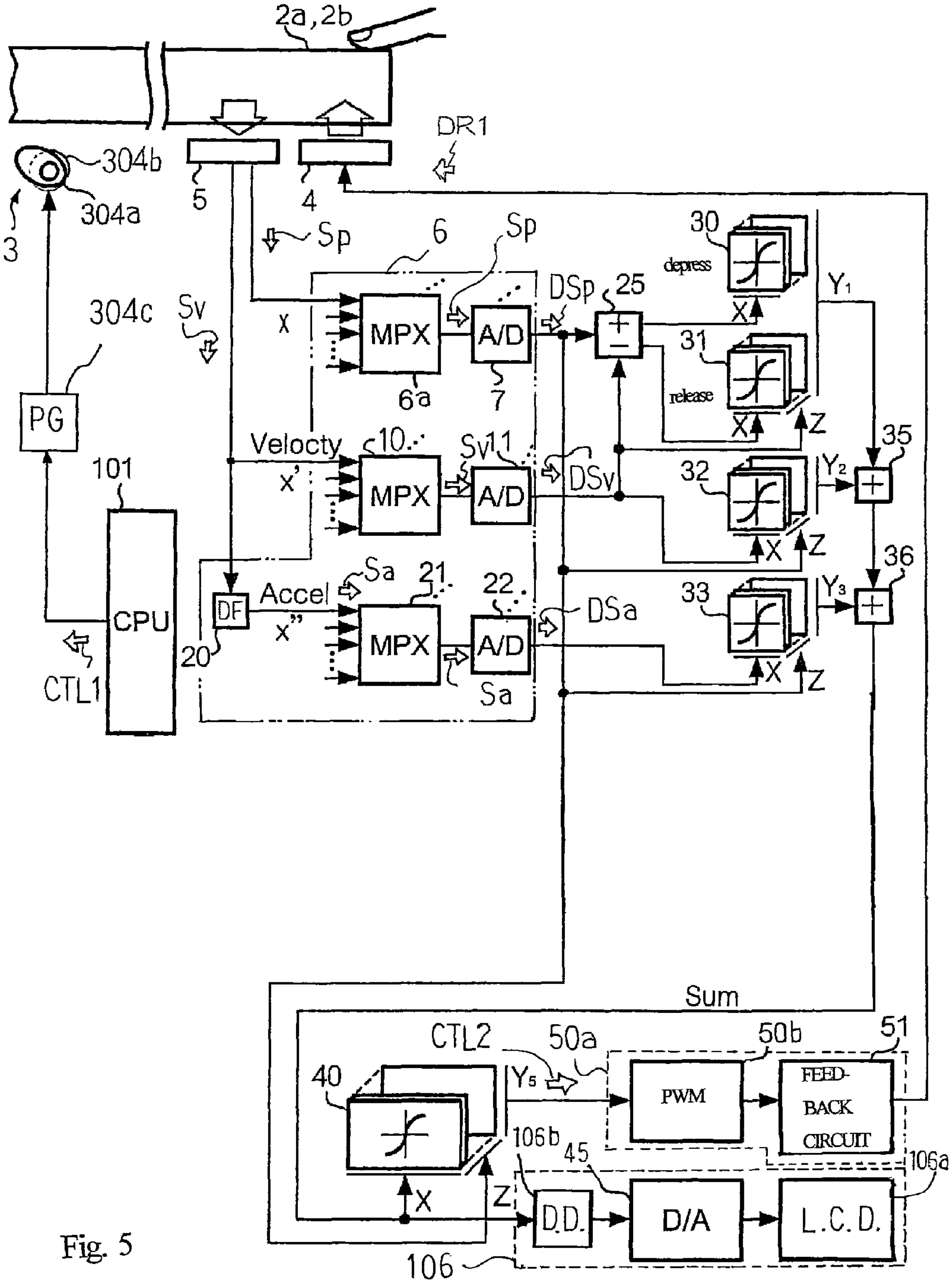
FIG. 5 is a block diagram showing the functions of an electromechanical load applier incorporated in the keyboard musical instrument.

As described hereinbefore, the subroutine programs are prepared for generating the electronic tones and controlling the inner force sense. Although the subroutine programs run on the central processing unit 101 in parallel, description is hereinafter made on the subroutine program for controlling the inner force sense, because the generation of electronic tones is well known to persons skilled in the art. FIG. 5 shows functions of the load applier 1*b*, and the functions are realized partially through the software and partially through wired-logic circuits.

The logic circuits 6 are connected between the sensors 5 and the information processing system 1*c*, and multiplexers 6*a*, 10 and 21, analog-to-digital converters 7, 11 and 22 and differentiators 20 serve as the logic circuits 6.

Each of the multiplexers 6*a* is connected to twelve plunger position sensors 5*a*, which are associated with the keys 2*a* and 2*b* in each octave. The keyboard unit 100 has eighty-eight keys 2*a* and 2*b* so that eight multiplexers 6*a* are prepared for all of the black keys 2*a* and white keys 2*b*. The eight multiplexers 6*a* are respectively connected to the analog-to-digital converters 7. The twelve plunger position signals Sp are periodically sequentially converted to digital plunger position signals DSp through the analog-to-digital converter 7.

Each of the multiplexers 10 is connected to twelve plunger velocity sensors Sb so that eight multiplexers 10 are prepared for all of the black keys 2*a* and white keys 2*b*. The plural multiplexers 10 are respectively connected to the analog-to-digital converters 11. The multiplexers 10 are synchronized with the multiplexers 6*a* so that the plunger position signal Sp and plunger velocity signal Sv are representative of the current plunger position x and current plunger velocity v', both of which express the movement of one of the keys 2*a* and 2*b*. The twelve plunger velocity signals Sv are periodically sequentially converted to digital plunger position signals DSv through the associated analog-to-digital converter 11.

The differentiators 20 are prepared for all of the black keys 2*a* and white keys 2*b*, respectively, and the plunger velocity signals Sv is differentiated through the differentiators 20. Pieces of plunger acceleration data x" are produced from the pieces of plunger velocity data x' through the differentiation at the differentiators 20, and plunger acceleration signals Sa are supplied to the eight multiplexers 21. The multiplexers 21 are respectively connected to the analog-to-digital converters 22, and are also synchronized with the multiplexers 6*a*. For this reason, the plunger acceleration signal Sa is representative of current acceleration v", and the current acceleration v"

also express the movement of the key 2a or 2b together with the current plunger position x and current plunger velocity v'. The plunger acceleration signals Sa are periodically sequentially supplied from the multiplexers 21 to the associated analog-to-digital converters 22, and digital plunger acceleration signals DSa are produced from the plunger acceleration signals Sa.

As described hereinbefore, the logic circuits 6 periodically sequentially produces the digital plunger position signals DSp, digital plunger velocity signals DSv and digital plunger acceleration signals DSa from the plunger position signal Sp and plunger velocity signal Sv at regular time intervals, and the eight digital plunger position signals DSp, eight plunger velocity signals DSv and eight digital plunger acceleration signals DSa express the movements of eight keys 2a and 2b in each regular time interval. The digital plunger position signals DSp, digital plunger velocity signals DSv and digital plunger acceleration signals DSa are fetched by the central processing unit 101 also at regular time intervals.

The solenoid driver 50a includes a pulse width modulator 50b, which is abbreviated as "PWM", and a feedback circuit 51. A pulse width control data CTL2, which is representative of a piece of load application data, is supplied to the pulse width modulator 50b, and the piece of load application data expresses the amount of mean current of the driving signal DR1. In this instance, the driving signal DR1 is produced as a pulse train, and the duty ratio of pulse train is equivalent to the mean current. The pulse width modulator 50b produced the driving signal DR1 at the given duty ratio, and the driving signal DR1 is supplied from the pulse width modulator 50b to the feedback circuit 51. Although the environmental temperature has undesirable influence on the thrust of plungers 402, the feedback circuit 51 keeps the thrust at the value expressed by the piece of inner force sense data by virtue of the feedback circuit 51. Thereafter, the driving signal DR1 is supplied from the feedback circuit 51 to the small-sized solenoid-operated actuators 4.

Plural sets of inner force sense tables 30, 31, 32 and 33 are stored in the data storage facility 104. Since the pieces of inner force sense data in terms of the plunger position x are plotted on a hysteresis, the inner force sense table 30 and inner force sense table 31 are prepared for the plunger position x on the way from the rest position to the end position and the plunger position x on the way from the end position to the rest position, respectively. The pieces of inner force sense data, which express the load applied to the keys 2a and 2b, are correlated with the physical quantity expressing the movements of keys 2a and 2b. The plunger position x is the physical quantity in the inner force sense tables 30 and 31. The inner force sense table 30 is assigned to the depressed keys 2a and 2b, and the inner force sense table 31 is assigned to the released keys 2a and 2b. The plunger velocity v' is the physical quantity in the inner force sense table 32, and the plunger acceleration v" is the physical quantity in the inner force sense table 33. Box 25 stands for a function to change the hysteresis.

The plural sets of inner force sense tables 30, 31, 32 and 33 are respectively assigned to plural sorts of musical instruments. When the player selects one of the plural sorts of musical instruments such as, for example, an acoustic piano on the visual image producer 106, one of the plural sets of inner force sense tables 30, 31, 32 and 33 is specified to be accessed, and the set of inner force sense tables 30, 31, 32 and 33 are repeatedly accessed in the performance so as to give rise to the inner force sense like that on the keys of the acoustic piano. The selected set of inner force sense tables 30, 31, 32 and 33 are transferred from the data storage facility 104 to the random access memory 103, and the central processing unit 101 gets ready to give rise to the inner force sense in the player.

The inner force sense table 30/31 has plural planes Z, which are prepared for different values of plunger velocity x', and relation between the current plunger position x and the piece of inner force sense data is defined in each plane in the form of orthogonal array X-Y1. The inner force sense table 32 has plural planes Z, which are prepared for different value of plunger position x, and relation between the current plunger velocity x' and the piece of inner force sense data is defined in each plane in the form of orthogonal array X-Y2. The inner force sense table 33 also has plural planes Z, which are prepared for different values of plunger position x, and relation between the current plunger acceleration x" and the piece of inner force sense data is defined in each plane in the form of orthogonal array X-Y3.

The pieces of inner force sense data for acoustic pianos are described in detail in Japan Patent Application laid-open No. Hei 10-177378 so that no further description is hereinafter incorporated for the sake of simplicity.

The piece of plunger position data x and piece of plunger position data x' are supplied to the inner force sense tables 30 and 31, and a piece of inner force sense data Y1 is read out from the inner force sense table 30 or 31. The piece of plunger velocity data x' and piece of plunger position data x are supplied to the inner force sense table 32, and a piece of inner force sense data Y2 is read out from the inner force sense table 32. The piece of plunger acceleration data x" and piece of plunger position data x are supplied to the inner force sense table 33, and a piece of inner force sense data Y3 is read out from the inner force sense table 33.

Figure 6:
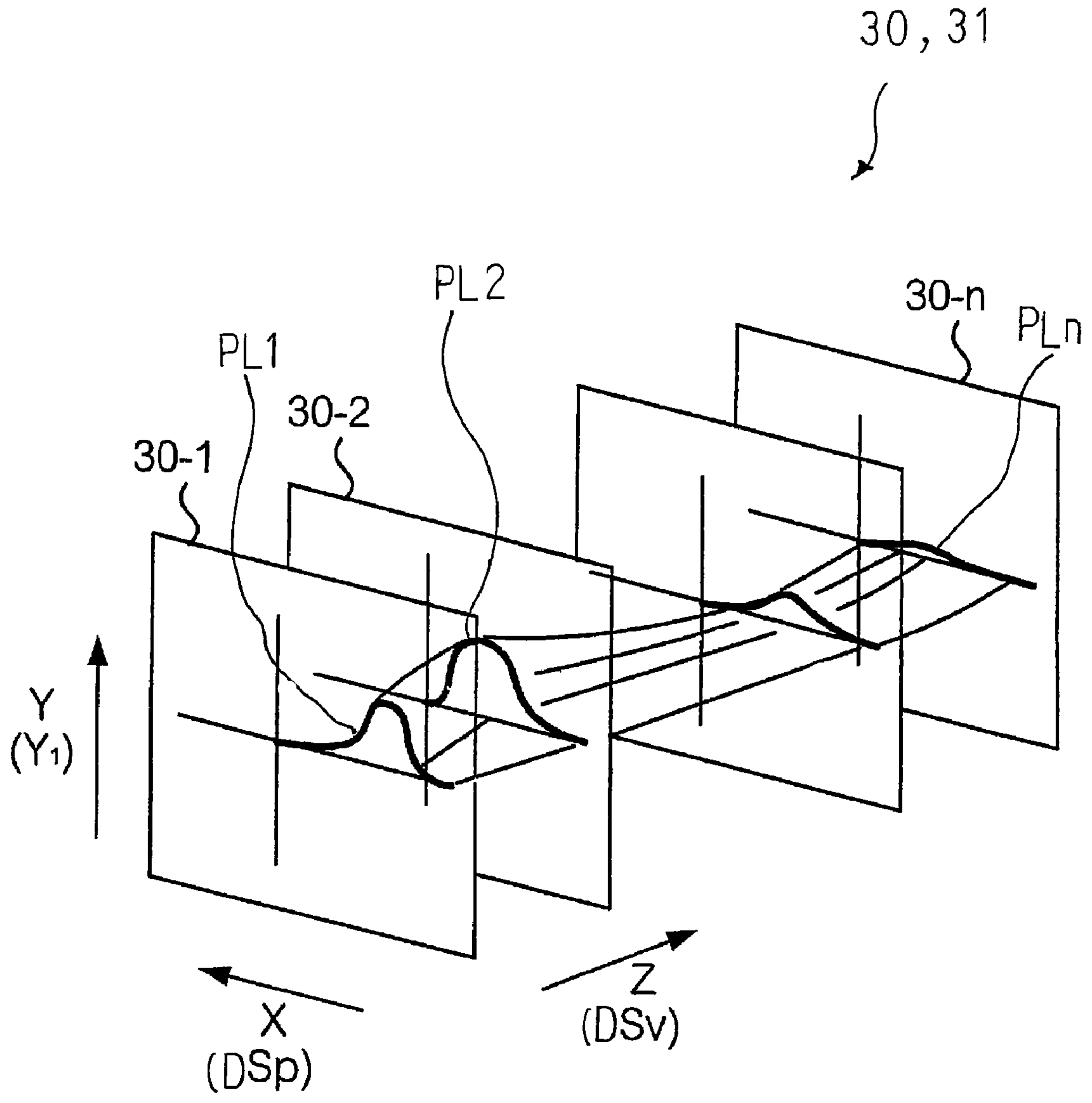
FIG. 6 is a schematic perspective view showing the data structure of an inner force sense table.

FIG. 6 shows the data structure of inner force sense table 30 or 31. In this instance, the first plane to $n^{th}$ plane are labeled with 30-1, 30-2, . . . . And 30-n, and define the relation PL1, PL2, . . . and PLn between the plunger position x represented by the digital plunger position signal DSp and the piece of inner force sense data Y1 at different values of plunger velocity represented by the digital plunger velocity signal DSv. In case where the inner force sense table 30 or 31 expresses the relation for an acoustic piano, the inner force sense data expresses the elastic load of the component parts of a selected musical instrument at different current key positions.

When the central processing unit 101 accesses the inner force sense table 30 or 31 with the current plunger position x and current plunger velocity x', one of the planes 30-1 to 30-n is selected from the inner force sense table 30 or 31 with reference to the current plunger velocity x', and a piece of inner force sense data Y1 is specified on the relation with reference to the current plunger position x. The piece of inner force sense data Y1 is output from the inner force sense table 30 or 31. In case where the current plunger position x has a value between two discrete values of plunger velocity x' assigned two of the planes 30-1 to 30-n, the value of piece of inner force sense data is determined through an interpolation.

The other inner force sense tables 32 and 33 have data structures similar to the data structure shown in FIG. 6. In the inner force sense table 32, the planes Z are prepared for different values of key position x, and the relation between the plunger velocity x' and the inner force sense data Y2 is defined on the plural planes Z. The pieces of inner force sense data Y2 express the viscous load of the component parts of the selected musical instrument, and are varied depending on the current plunger velocity x'.

The inner force sense table 33 also has the plural planes Z for different values of key position x, and the relation between the plunger acceleration x" and the inner force sense data Y3 is defined on the plural planes Z. The pieces of inner force sense data Y3 express the inertial load of the component parts of the selected musical instrument, and are varied depending upon the current plunger acceleration x''. In this instance, the mechanical load applier 3 is adapted to apply the inertial load to the black keys 2*a* and white keys 2*b* so that the pieces of inner force sense data in table 33 are less than the corresponding pieces of inner force sense data in the table of the prior art system by the inertial load applied by the mechanical load applier 3.

In case where the selected musical instrument is an acoustic piano, black keys, white keys and action units are examples of the component parts.

One of the inner force sense tables 30 and 31 is selected from the set of inner force sense tables at every time interval through the function 25 to change the hysteresis. When the digital plunger velocity signal DSv is renewed, the central processing unit 101 checks the digital plunger velocity signal DSv to see whether the piece of current plunger velocity data x' has a positive value or a negative value, and transfers the piece of plunger position data x to the inner force sense table 30 on the condition that the digital plunger velocity signal DSv has a positive value. On the other hand, if the digital plunger velocity signal DSv has a negative value, the central processing unit 101 transfers the piece of plunger position data x to the other inner force sense table 31. While the keys 2*a* and 2*b* are traveling from the rest positions toward the end positions, the current plunger velocity x' has positive values. On the other hand, while the keys 2*a* and 2*b* are returning toward the rest positions, the current plunger velocity x' has negative values. Thus, the inner force sense table 30 is assigned to the depressed keys 2*a* and 2*b*, and the other inner force sense table 31 is assigned to the released keys 2*a* and 2*b*.

The piece of read-out inner force sense data Y1 is added to the piece of read-out inner force sense data Y2 through function 35, and the sum of pieces of read-out inner force sense data (Y1+Y2) is added to the piece of read-out inner force sense data Y3 through function 36.

The pieces of load applier control data are further stored in the data storage facility 104. The pieces of load applier control data are prepared for the plural sorts of musical instruments, and each of the load applier control data expresses whether or not the load applier 1*b* gives rise to the inner force sense with the assistance of the mechanical load applier 3. For example, the keys of a grand piano are large in inertial load so that the piece of load applier control data for the grand piano expresses the activation of mechanical load applier 3. On the other hand, the keys of an organ are small in inertial load so that the piece of load applier control data for the organ expresses the deactivation of mechanical load applier 3.

When the player selects one of the musical instruments on the visual image producer 106, the central processing unit 101 reads out the piece of load applier control data from the data storage facility 104 for the selected musical instrument, and supplies a control signal CTL1 to the pulse generator 304*c*. The pulse generator 304*c* is responsive to the control signal CTL1 so as to drive the stepping motor 304*b*. The minor axis of cam rod 304*a* becomes perpendicular to the rear load portions 302, and causes the hammers 300 to enter the activated positions.

While the hammers 300 are staying at the activated positions, the mechanical load applier 3 gives rise to the part of inner force sense, and the electromechanical load applier 1*d* is merely expected to give rise to the remaining part of inner force sense. For this reason, the pieces of inner force data for the acceleration are smaller in value than the pieces of inner force data for the acceleration in the prior art inner force sense control system disclosed in Japan Patent Application laid-open No. Hei 10-177378. Accordingly, the solenoid-operated actuators 4 are small in size than the solenoid-operated actuators incorporated in the prior art inner force sense control system disclosed in the Japan Patent Application laid-open.

When the player selects a musical instrument having the keys with relatively small inertial load such as, for example, an organ, the hammers 300 are changed to the deactivated positions, and any inertial load is not applied to the player by means of the mechanical load applier 3. However, the inner force sense is small. For this reason, it is possible to give rise to the small inner force sense in the player by means of the small-sized solenoid-operated actuators 4.

In this instance, the pieces of inner force sense data stored in the inner force sense table 33 express small values of inertial load, and are used delicately to vary the inner force sense of the player.

An actuator control table 40 is further stored in the data storage facility 104, and has plural planes Z. The plural planes Z are respectively prepared for different values of plunger position x. Relation between the pieces of load application data Y5 and the sum of read-out inner force sense data Sum, i.e., (Y1+Y2+Y3) is defined in each plane of actuator control table 40. The load application data Y5 expresses the mean current of a driving signal DR1 to be supplied from the solenoid driver 50*a* to the small-sized solenoid-operated actuators 4. When the sum of read-out inner force sense data Sum has a value of the current key position between the values assigned two of the planes Z, the piece of load application data Y5 is determined through the interpolation.

Solenoid-operated actuators 4 have non-linear stroke-to-thrust characteristics. For this reason, the thrust is varied together with the plunger stroke. The actuator control table 40 aims at standardization of the non-linear stroke-to-thrust characteristics. Therefore, the pieces of load application data make an expected value of thrust generated by means of the small-sized solenoid-operated actuators 4 regardless of the current plunger position x. Thus, the designer easily optimizes the load applied to the keys 2*a* and 2*b* by virtue of the actuator control table 40.

Although the movements of eight keys 2*a* and 2*b* are concurrently analyzed for the inner force sense, description is hereinafter made on the data processing for one of the eight keys 2*a* and 2*b* for the sake of simplicity.

The player firstly instructs the electronic system 1*a* to give rise to the inner force sense in him or her through the manipulating panel 104. The central processing unit 101 makes the visual image producer 106 produce the list of musical instruments. The player is assumed to select an acoustic grand piano from the list of musical instruments. The central processing unit 101 accesses the data storage facility, and reads out the piece of load applier control data prepared for the acoustic grand piano. The piece of load applier control data expresses the activation of mechanical load applier 3.

The central processing unit 101 checks the current status of mechanical load applier 3. If the mechanical load applier 3 is found in the activated state, the central processing unit 101 keeps the cam rod 304*a* at the present angular position so that the minor axis of cam rod 304*a* makes the hammers 300 stay at the activated positions. If, on the other hand, the mechanical load applier 3 is found in the deactivated state, the central processing unit 101 supplies the control signal CTL1 to the pulse generator 304*c*. The pulse generator 304*c* supplies the pulse train to the stepping motor 304*b* until the cam rod 304*a* is brought into contact with the rear load portions 302 at the minor axis. Then, the load applying portions 301 are brought into contact with the head portions of regulating screws 306.

If the player selects an organ from the list of musical instruments, the central processing unit 101 makes the cam rod 304*a* in contact with the rear load portions 302 at the major axis so that the mechanical load applier 3 is deactivated.

Furthermore, the set of inner force sense tables 30, 31, 32 and 33 is transferred from the data storage facility 104 to the random access memory 103, and the actuator control table 40 is further transferred from the data storage facility 104 to the random access memory 103. Upon completion of data transfer, the main routine program starts periodically to branch to the subroutine program for the electronic tones and the subroutine program for the inner force sense. Thus, the load applier 1*b* gets ready to give rise to the inner force sense in the player.

While the player is fingering on the keyboard unit 100, he or she is assumed to depress a white key 2*b*. When the white key 2*b* starts to travel from the rest position, the hammer 300 applies the inertial load to the depressed white key 2*b*, and the plunger position sensor 5*a* and plunger velocity signal 5*b* vary the piece of plunger position data x and the piece of plunger velocity data x'.

The plunger position signal Sp and plunger velocity signal Sv are transferred from the multiplexers 6*a* and 10 to the analog-to-digital converters 7 and 11, and are converted to the digital plunger position signal DSp and digital plunger velocity signal DSv. The plunger velocity signal Sv is further supplied to the differentiator 20, and the plunger acceleration signal Sa is transferred from the multiplexer 21 to the analog-to-digital converter 22. The plunger acceleration signal Sa is converted to the digital plunger acceleration signal DSa through the analog-to-digital converter 22. The central processing unit 101 fetches the piece of plunger position data, piece of plunger velocity data and piece of plunger acceleration data, and writes them in the random access memory 103.

The central processing unit 101 analyzes the digital plunger velocity signal DSv, and selects the inner force sense table 30 for the depressed white key 2*b* through the function 25. The central processing unit 101 accesses the inner force sense tables 30, 32 and 33 with the piece of plunger position data, piece of plunger velocity data and piece of plunger acceleration data so that the piece of inner force sense data Y1, piece of inner force sense data Y2 and piece of inner force sense data Y3 are read out from inner force sense tables 30, 32 and 33, respectively. The pieces of inner force sense data Y1, Y2 and Y3 are temporarily stored in the random access memory 103.

The central processing unit 101 sequentially reads out the pieces of inner force sense data Y1, Y2 and Y3 from the random access memory 103. The central processing unit 101 adds the value of piece of inner force sense data Y1 to the value of piece of inner force sense data Y2 through the function 35, and further adds the value of piece of inner force sense data Y3 to the sum (Y1+Y2) through the function 36.

The central processing unit 101 accesses the actuator control table 40 with the piece of plunger position data and sum of pieces of inner force sense data Sum, and the piece of load application data Y5 is read out from the actuator control table 40. The central processing unit 101 supplies the control signal CTL2 to the pulse width modulator 50*b*, and the duty ratio is strictly adjusted to the target value at which the small-sized solenoid-operated actuator 4 generates the target amount of load at the current plunger position x. The driving signal DR1 is supplied from the feedback circuit 51 to the small-sized solenoid-operated actuator 4 associated with the depressed white key 2*b*. Thus, the mechanical load applier 3 and electromechanical load applier 1*d* cooperate with each other so as to apply the load to the depressed white key 2*b*, and give rise to the inner force sense to the player.

While the depressed white key 2*b* is traveling from the rest position toward the end position, the above-described functions are repeated, and the mechanical load applier 3 and electromechanical load applier 1*d* make the inner force sense varied as similar to that during the performance on the acoustic grand piano.

When the white key 2*b* starts to return toward the rest position, the central processing unit 101 changes the selected table from the inner force sense table 30 to the other inner force sense table 31, and repeats the control sequence described in conjunction with the depressed white key 2*b* for the released white key 2*b*.

The inner force sense tables 30/31, 32 and 33 are prepared for individual control parameters, i.e., the current plunger position x, current plunger velocity x' and current plunger acceleration x". This feature is desirable. In detail, the reaction force against the key movements is broken down into the plural components Y1, Y2 and Y3, and the plural components are independently correlated with the control parameters x, x' and x" in the inner force sense tables 30/31, 32 and 33. Although the different sorts of musical instruments make the plural components Y1, Y2 and Y3 uniquely varied in the key movements, the designer can vary the plural components Y1, Y2 and Y3 independently of one another in the inner force sense tables 30/31, 32 and 33 for each of the different sorts of musical instruments. This results in that the electromechanical load applier 1*d* gives rise to the inner force sense close to the selected musical instrument in the player. Thus, the electromechanical load applier 1*d* can reproduce the inner force sense unique to the individual musical instruments at high fidelity.

In case where the player instructs the electronic system 1*a* to reproduce the inner force sense of an acoustic piano, the player feels the reproduced inner force sense close to the variable inner force sense due to the play of action units, free vibrations of hammers, collision between the hammers and the strings and deformation of action units.

As will be appreciated from the foregoing description, the inertial load is shared between the mechanical load applier 3 and the electromechanical load applier 1*d* with reference to the inner force sense table 33. The designer makes it possible to reduce the values of pieces of inner force sense data Y3. As a result, the sum of pieces of inner force sense data Sum is smaller in value than those of the prior art inner force sense system disclosed in the Japan Patent Application laid-open. This results in the small-sized solenoid-operated actuators 4.

Second Embodiment

Figure 7:
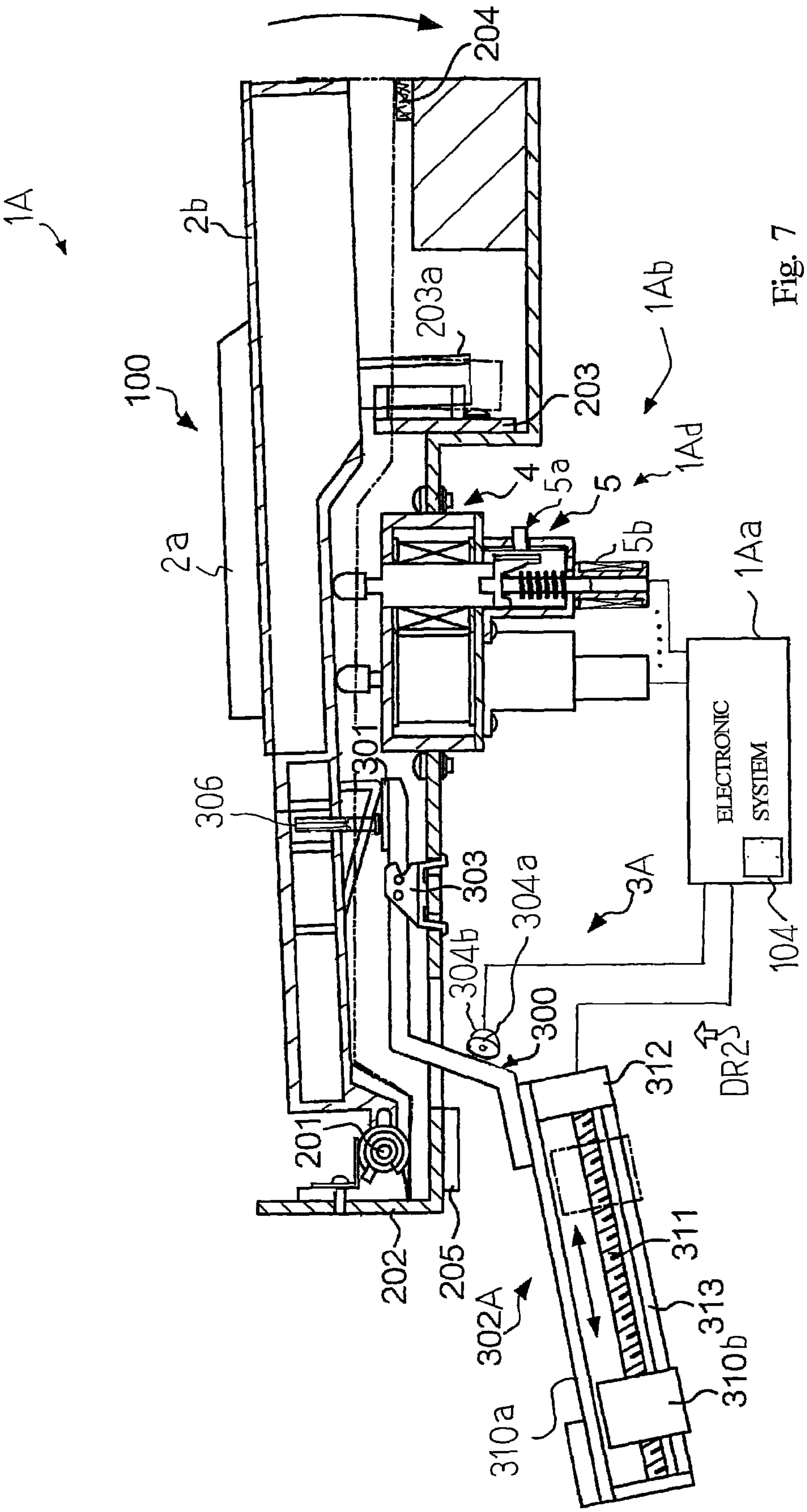
FIG. 7 is a cross sectional side view showing the structure of another musical instrument of the present invention.

Turning to FIG. 7 of the drawings, another keyboard musical instrument 1A embodying the present invention largely comprises an electronic system 1Aa, a load applier 1Ab and a keyboard unit 100A. The electronic system 1Aa and keyboard unit 100A are similar in structure to those of the electronic system 1*a* and keyboard unit 100. For this reason, system components of the electronic system 1Aa and component parts of the keyboard unit 100A are labeled with references same as those designating the corresponding system components and corresponding component parts without detailed description.

The load applier 1Ab includes an electromechanical load applier 1Ad and a mechanical load applier 3A. The electromechanical load applier 1Ad is same as the electromechanical load applier 1*d*, and component parts of the electromechanical load applier 1Ad are labeled with references same as those designating the corresponding component parts of electromechanical load applier 1*d*.

The mechanical load applier 3A is similar to the mechanical load applier 3 except for a variable load mechanism 302A. In other words, the rear load portions 302 are respectively replaced with variable load units of the variable load mechanism 302A. For this reason, description is hereinafter focused on the variable load units.

Each of the variable load units 302A is secured to the rear portions of hammers 300, and includes a frame 310*a*, a movable weight piece 310*b*, a feed screw 311, a motor 312 and a guide rod 313. The frame 310*a* is secured to the rear portion of hammer 300, and the feed screw 311 is rotatably supported by the frame 310*a*. The guide rod 313 is connected to the frame 310*a* in parallel to the feed screw 311. The motor 312 is supported by the frame 310*a*, and the output shaft of motor 312 is connected to one end of the feed screw 311. The movable weight piece 310*b* is made of metal or alloy. The movable weight piece 310*b* has a column configuration, and is formed with a female screw and a through-hole. The feed screw 311 is held in threaded engagement with the female screw, and the guide rod 313 passes the through-hole.

The pieces of load applier control data, which are stored in the data storage facility 104 of the electronic system 1Aa, express the amount of inertial load to be applied to the keys 2*a* and 2*b*. If the piece of load applier control data expresses zero for a certain musical instrument, the central processing unit 101 supplies the control signal CTL1 to the pulse generator 304*c*, and makes the cam rod 304*a* brought into contact with the hammers 300 at the major axis. In this situation, the front acting portions 301 are spaced from the head portions of regulating screws 306, and any mechanical inertial load is not applied to the black keys 2*a* and white keys 2*b*.

On the other hand, the piece of load applier control data expresses 1 for another certain musical instrument, the central processing unit 101 makes the cam rod 304*a* held in contact with the hammers 300 at the minor axis, and supplies a driving signal DR2 to the motor 312 so as to drive the feed screw 311 for rotation in a certain direction. While the feed screw 311 is being driven in the certain direction, the movable weight piece 310*b* is moved in the leftward direction in FIG. 7 to the leftmost position. The moment due to the movable weight piece 310*b* and, accordingly, the inertial load are maximized.

In the piece of load applier control data expresses a value greater than zero and less than 1, the central processing unit 101 makes the movable weight piece 310*b* stop at an intermediate position closer to the rightmost position than the leftmost position. As a result, the inertial load is reduced for yet another musical instrument.

As will be understood from the foregoing description, the mechanical load applier 3A applies the inertial load to the black keys 2*a* and white keys 2*b*, and regulates the inertial load to a value appropriate to the selected musical instrument. As a result, the designer can reduce the amount of load to be exerted by means of the electromechanical load applier 1Ad. This results in the small-sized solenoid-operated actuators 4.

Third Embodiment

Figure 8:
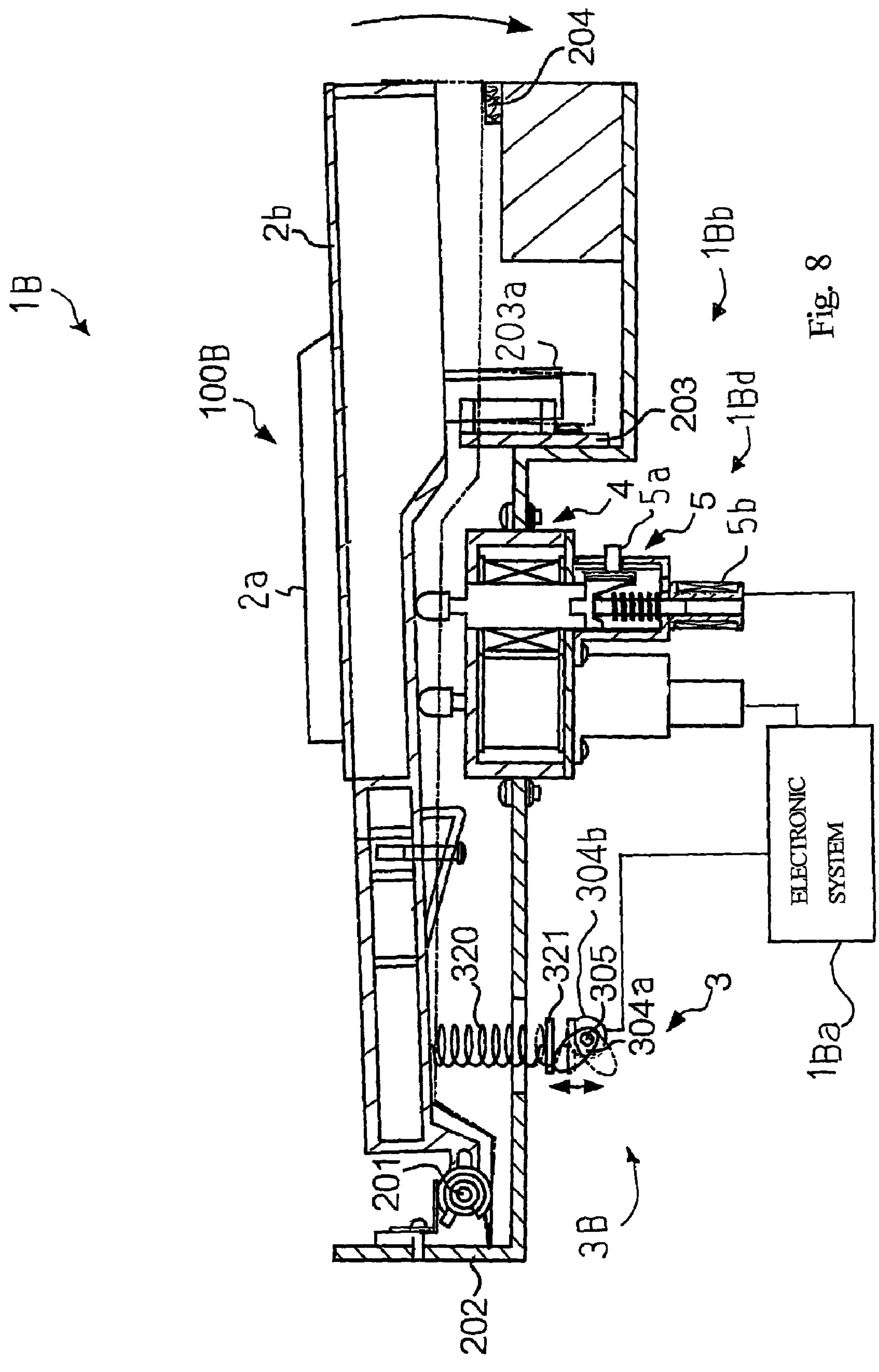
FIG. 8 is a cross sectional side view showing the structure of yet another musical instrument of the present invention.

Turning to FIG. 8 of the drawings, yet another keyboard musical instrument 1B embodying the present invention largely comprises an electronic system 1Ba, a load applier 1Bb and a keyboard unit 100B. The electronic system 1Ba and keyboard unit 100B are similar in structure to those of the electronic system 1*a* and keyboard unit 100. For this reason, system components of the electronic system 1Ba and component parts of the keyboard unit 100B are labeled with references same as those designating the corresponding system components and corresponding component parts without detailed description.

The load applier 1Bb includes an electromechanical load applier 1Bd and a mechanical load applier 3B. The electromechanical load applier 1Bd is same as the electromechanical load applier 1*b*, and component parts of the electromechanical load applier 1Bd are labeled with references same as those designating the corresponding component parts of electromechanical load applier 1*d*.

The mechanical load applier 3B is adapted to apply elastic load to the black keys 2*a* and white keys 2*b*, and includes plural elastic load units. Each of the plural elastic load units includes a coil spring 320, a supporting plate 321, a cam rod 304*a* and a stepping motor 304*b*. The cam rod 304*a* and stepping motor 304*b* are shared among the plural elastic load units, and a pulse generator (not shown) is connected to the stepping motor 304*b* as similar to the mechanical load applier 3.

The supporting plate 321 is held in contact with the cam rod 304*a*, and the coil spring 320 is connected at one end thereof to the supporting plate 321 and at the other end thereof to the associated key 2*a* or 2*b*. While the stepping motor 304*b* is driving the cam rod 304*a* for rotation, the supporting plate 321 is moved in the up-and-down direction, and varies the length of the coil spring 320.

While the player is depressing the key 2*a* or 2*b*, the depressed key 2*a* or 2*b* presses the coil spring 320, and the coil spring 320 exerts the elastic force F, which is expressed as $k \cdot x$ where k is the spring constant and x is the decrement of length of spring 320, on the depressed key 2*a* or 2*b* as the elastic load.

When the player selects a certain sort of musical instrument from the list of musical instrument, the central processing unit 101 reads out the piece of load applier control data from the random access memory 103, and drives the stepping motor 304*b* to move the cam rod 304*a* to an angular position suitable for the selected sort of musical instrument. Thus, the mechanical load applier 3B varies the amount of elastic load depending upon the selected sort of musical instrument.

As will be understood from the foregoing description, the mechanical load applier 3B applies the elastic load to the black keys 2*a* and white keys 2*b*, and regulates the elastic load to a value appropriate to the selected musical instrument. As a result, the designer can reduce the amount of load to be exerted by means of the electromechanical load applier 1Bd. This results in the small-sized solenoid-operated actuators 4.

Fourth Embodiment

Figure 9:
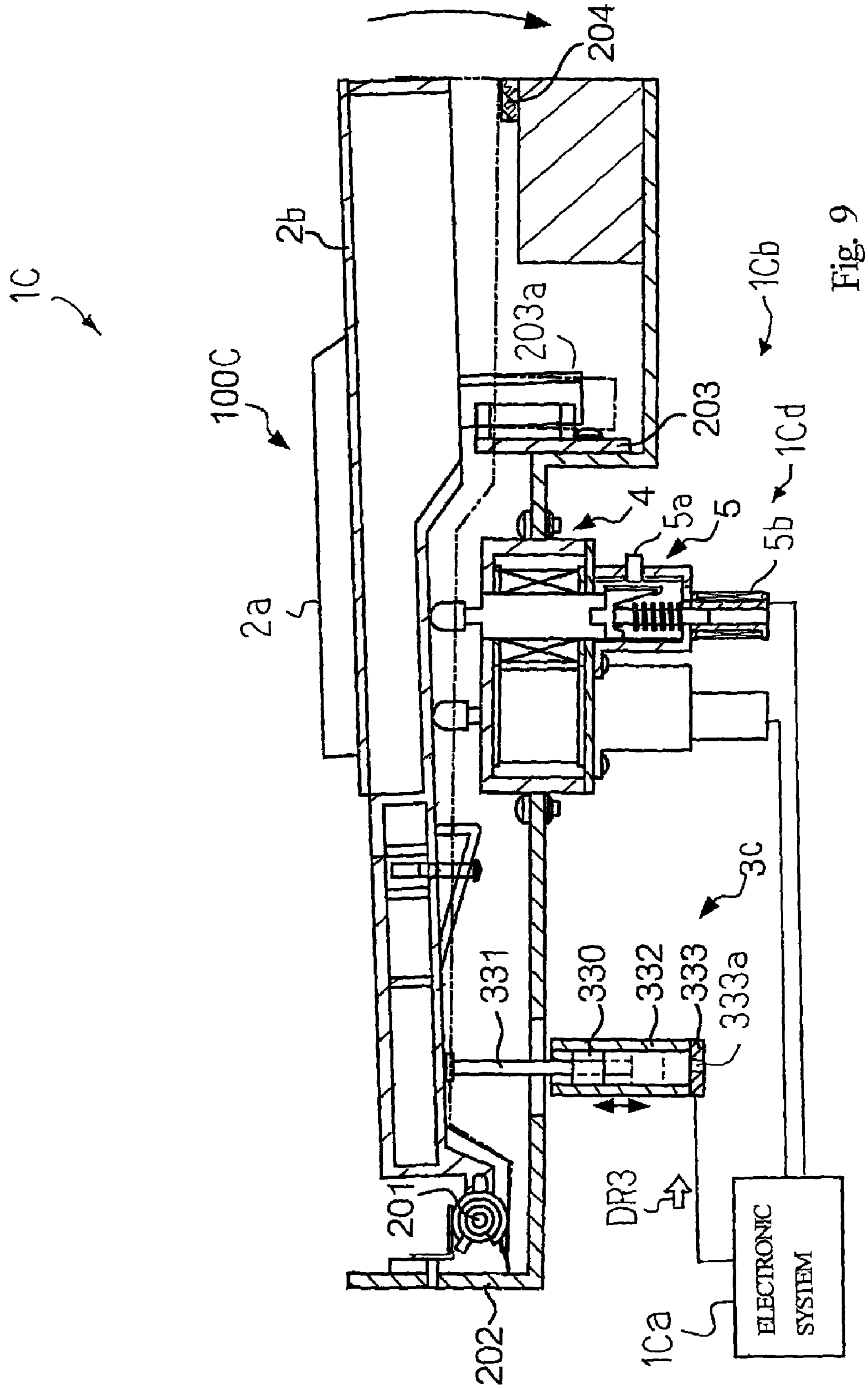
FIG. 9 is a cross sectional side view showing the structure of still another musical instrument of the present invention.

Turning to FIG. 9 of the drawings, still another keyboard musical instrument 1C embodying the present invention largely comprises an electronic system 1Ca, a load applier 1Cb and a keyboard unit 100C. The electronic system 1Ca and keyboard unit 100C are similar in structure to those of the electronic system 1*a* and keyboard unit 100. For this reason, system components of the electronic system 1Ca and component parts of the keyboard unit 100C are labeled with references same as those designating the corresponding system components and corresponding component parts without detailed description.

The load applier 1Cb includes an electromechanical load applier 1Cd and a mechanical load applier 3C. The electromechanical load applier 1Cd is same as the electromechanical load applier 1*d*, and component parts of the electromechanical load applier 1Cb are labeled with references same as those designating the corresponding component parts of electromechanical load applier 1*d*.

The mechanical load applier 3C is adapted to apply viscous load to the black keys 2*a* and white keys 2*b*, and includes plural viscous load units, which are respectively associated with the keys 2*a* and 2*b*. Each of the viscous load unit includes a piston 330, a rod 331, a cylinder 332 and a variable orifice unit 333. The rod 331 is connected at the upper end thereof to the associated key 2*a* or 2*b* and at the lower end to the piston 330. The piston 330 is provided inside the cylinder 332, and is movable together with the associated key 2*a* or 2*b*. The inner space of cylinder 332 is closed with the variable orifice unit 333, and, for this reason, the air is taken into and evacuated from the inner space of cylinder 332 through the variable office unit 333. For this reason, the viscous load unit offers resistance against the movements of associated key 2*a* or 2*b* due to the viscous fluid passing through the orifice 333*a*. In other words, the viscous load unit applies the viscous load to the associated key 2*a* or 2*b* depending upon the plunger velocity x'.

The cross sectional area of orifice 333*a* is electrically varied under the control of electronic system 1Ca. When the player selects a certain sort of musical instrument from the list of musical instruments, the central processing unit 101 reads out the piece of load applier control data from the random access memory 103 for the selected sort of musical instrument, and makes a driver (not shown) supply a driving signal DR3. The variable orifice unit 333 is responsive to the driving signal DR3, and changes the cross sectional area of orifice 333*a*.

As will be understood from the foregoing description, the mechanical load applier 3C applies the viscous load to the black keys 2*a* and white keys 2*b*, and regulates the elastic load to a value appropriate to the selected musical instrument. As a result, the designer can reduce the amount of load to be exerted by means of the electromechanical load applier 1Cd. This results in the small-sized solenoid-operated actuators 4.

Fifth Embodiment

Figure 10:
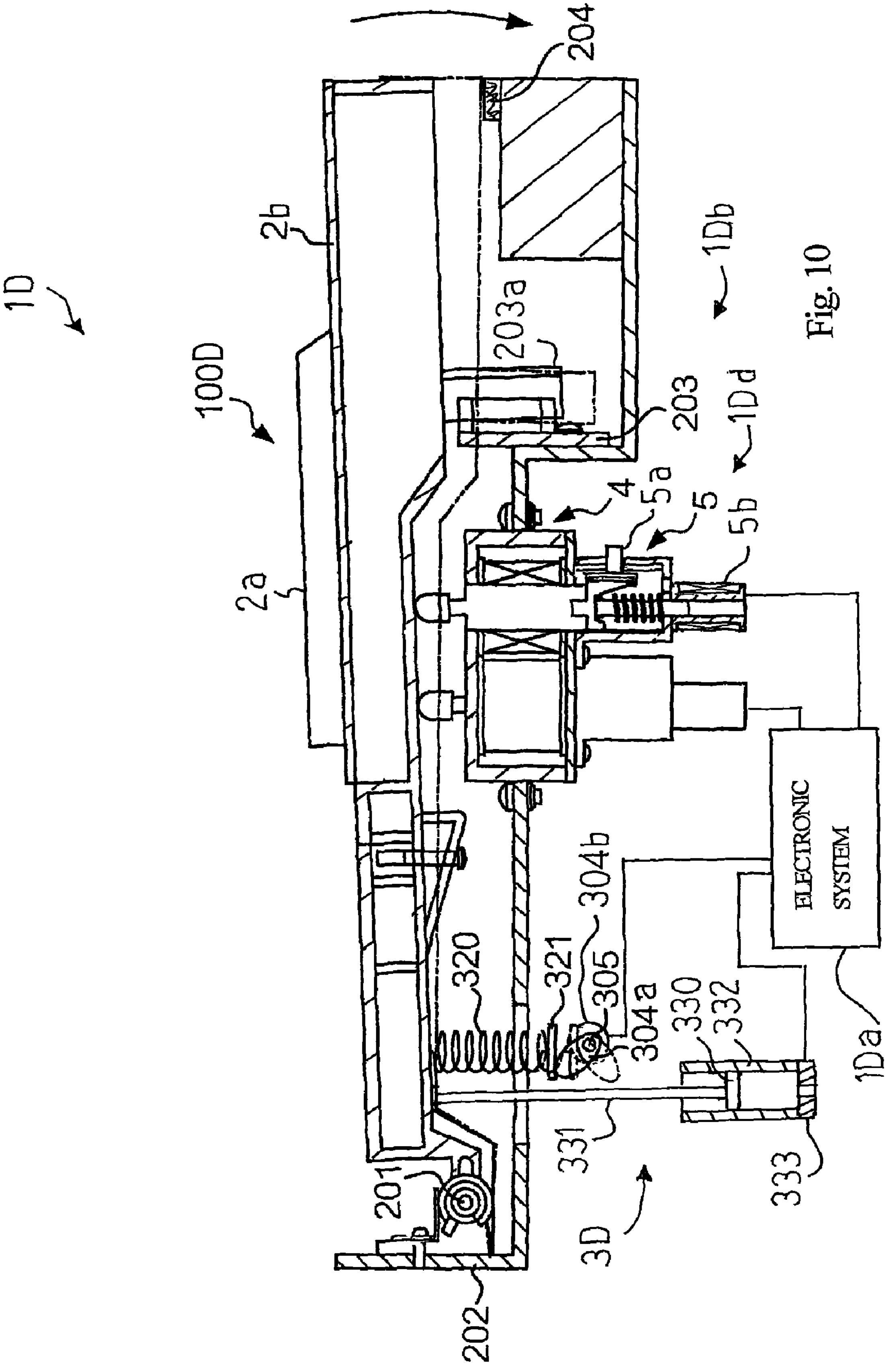
FIG. 10 is a cross sectional side view showing the structure of yet another musical instrument of the present invention.

Turning to FIG. 10 of the drawings, yet another keyboard musical instrument 1D embodying the present invention largely comprises an electronic system 1Da, a load applier 1Db and a keyboard unit 100D. The electronic system 1Da and keyboard unit 100D are similar in structure to those of the electronic system 1*a* and keyboard unit 100. For this reason, system components of the electronic system 1Da and component parts of the keyboard unit 100D are labeled with references same as those designating the corresponding system components and corresponding component parts without detailed description.

The load applier 1Db includes an electromechanical load applier 1Dd and a mechanical load applier 3D. The electromechanical load applier 1Dd is same as the electromechanical load applier 1*d*, and component parts of the electromechanical load applier 1Db are labeled with references same as those designating the corresponding component parts of electromechanical load applier 1*d*.

The mechanical load applier 3C is adapted to apply elastic load and viscous load to the black keys 2*a* and white keys 2*b*, and is equivalent to the combination of the mechanical load appliers 3B and 3C. For this reason, no further description is hereinafter incorporated for the sake of simplicity.

As will be understood from the foregoing description, the mechanical load applier 3D applies the elastic load and viscous load to the black keys 2*a* and white keys 2*b*, and independently regulates the elastic load and viscous load to values appropriate to the selected musical instrument. As a result, the designer can reduce the amount of load to be exerted by means of the electromechanical load applier 1Dd. This results in the small-sized solenoid-operated actuators 4.

Sixth Embodiment

Figure 11:
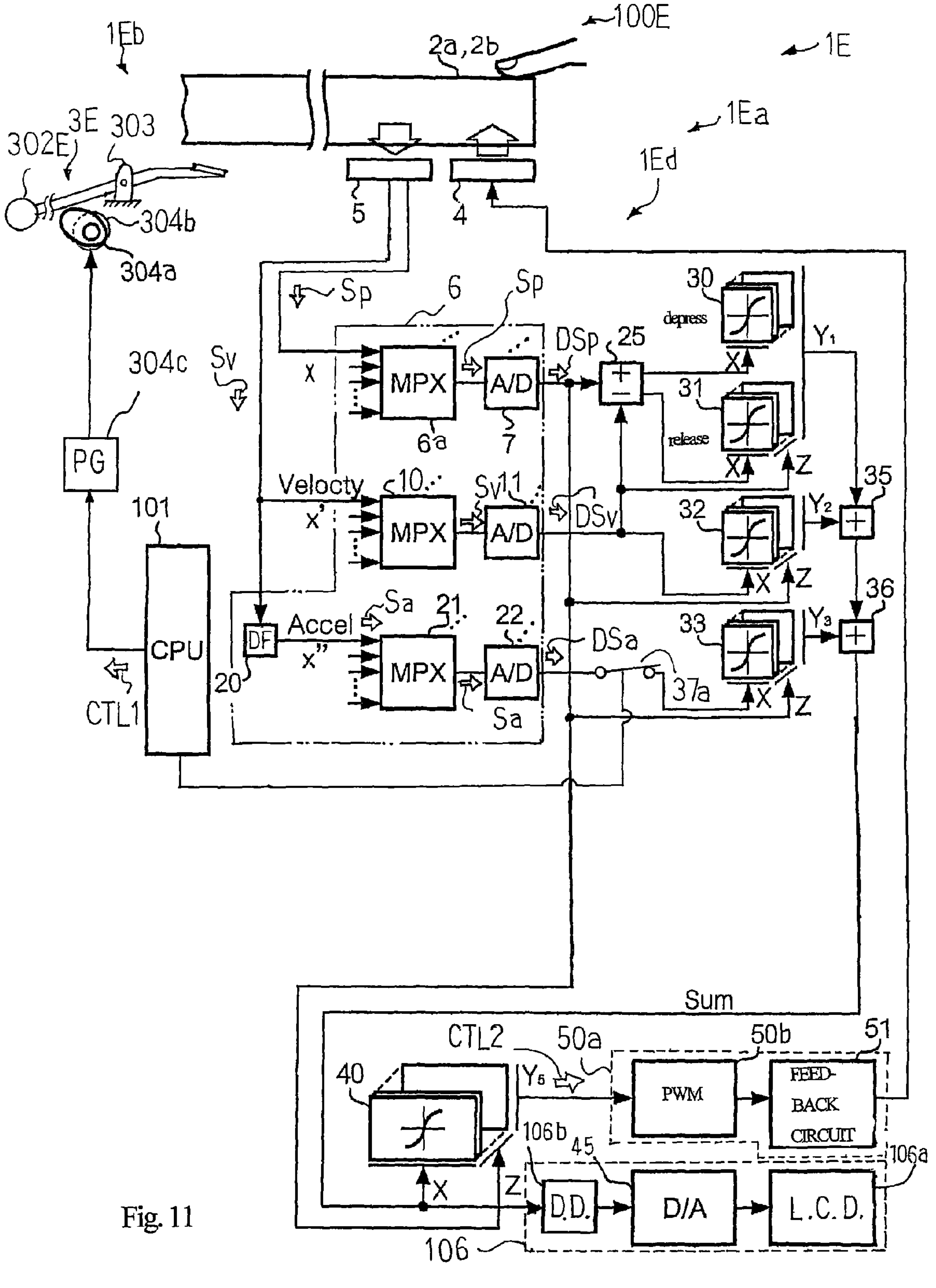
FIG. 11 is a block diagram showing the functions of an electromechanical load applier incorporated in still another keyboard musical instrument of the present invention.

Turning to FIG. 11 of the drawings, still another keyboard musical instrument 1E embodying the present invention largely comprises an electronic system 1Ea, a load applier 1Eb and a keyboard unit 100E. The electronic system 1Ea and keyboard unit 100E are similar in structure to those of the electronic system 1*a* and keyboard unit 100. For this reason, system components of the electronic system 1Ea and component parts of the keyboard unit 100E are labeled with references same as those designating the corresponding system components and corresponding component parts without detailed description.

The load applier 1Eb includes an electromechanical load applier 1Ed and a mechanical load applier 3E. The mechanical load applier 3E is similar to the mechanical load applier 3 except for a weight piece 302E. For this reason, the other component parts of the mechanical load applier 3 are labeled with references same as those designating corresponding parts of mechanical load applier 3. The weight piece 302E is adjusted to a suitable value at which the mechanical load applier 3E applies the inertial load to the associated key 2*a* or 2*b* without any inertial load of the electromechanical load applier 1Ed for a certain sort of musical instruments.

Accordingly, a switching function 37*a* is added to the electromechanical load applier 1Ed. The other functions of electromechanical load applier 1Ed are similar to those of the electromechanical load applier 1*d*. For this reason, description is focused on the switching function 37*a*.

The player is assumed to select the certain sort of musical instrument from the list of musical instruments. The central processing unit 101 reads out the piece of load applier control data, and determines that the pieces of inner force sense data Y3 expressing the inertial load are not required for the certain musical instrument. Then, the central processing unit 101 raises a flag in the random access memory for the inner force sense table 33. As a result, the pieces of inner force sense data Y3 are not read out from the inner force sense table 33, and the sum of pieces of inner force sense data (Y1+Y2) is supplied to the actuator control table 40.

The load applier 1Eb achieves the advantages of the first embodiment, and the solenoid-operated actuators 4 are reduced in size.

Seventh Embodiment

Figure 12:
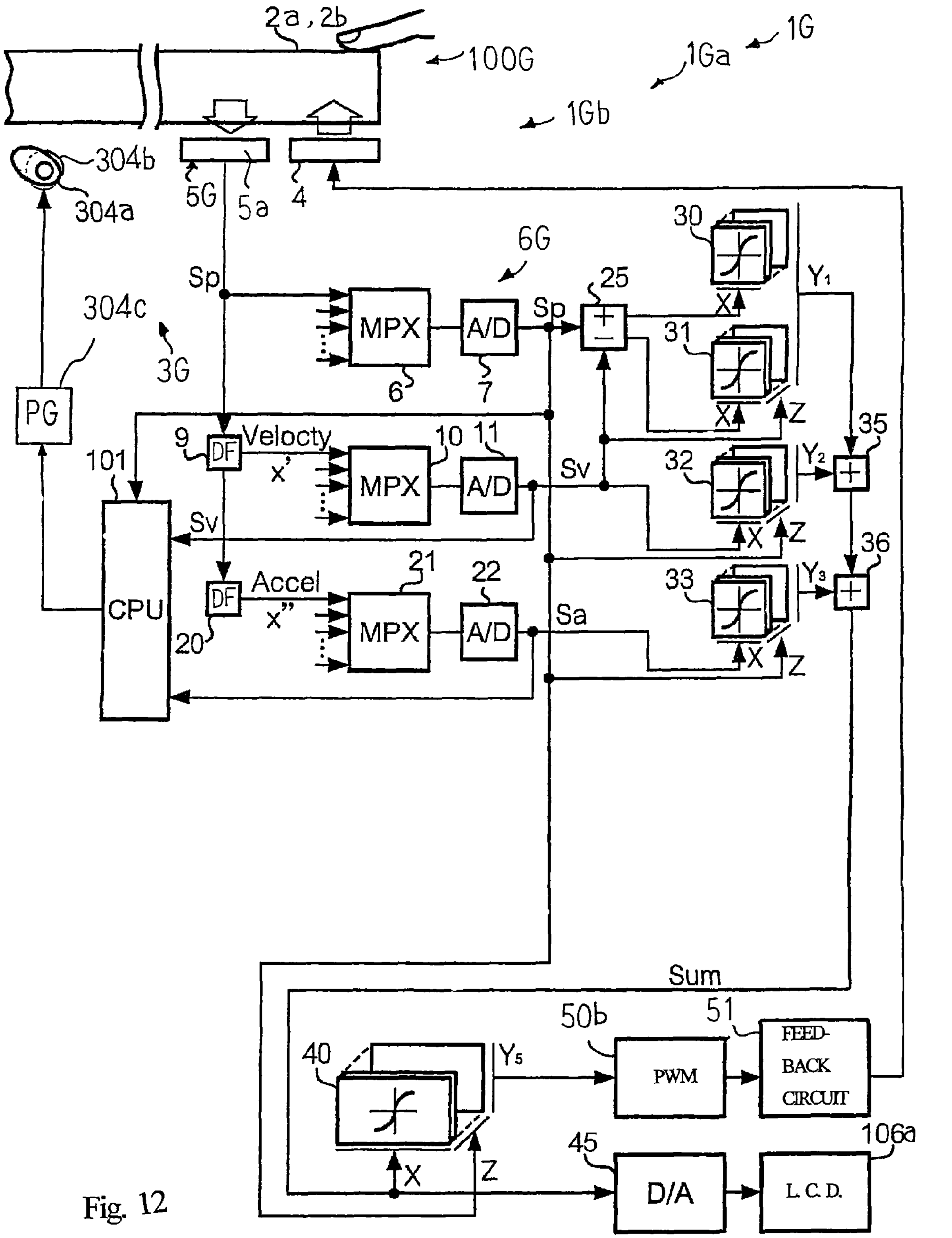
FIG. 12 is a block diagram showing the functions of an electromechanical load applier incorporated in yet another keyboard musical instrument of the present invention.

Turning to FIG. 12 of the drawings, yet another keyboard musical instrument 1G embodying the present invention largely comprises an electronic system 1Ga, a load applier 1Gb and a keyboard unit 10G. The electronic system 1Ga, load applier 1Gb and keyboard unit 100G are similar to the electronic system 1*a*, load applier 1*b* and keyboard unit 100 except for sensors 5G and logic circuits 6G. For this reason, system components of the electronic system 1Ga, functions and other component parts of load applier 1Gb and component parts of the keyboard unit 100G are labeled with references same as those designating the corresponding system components and corresponding component parts without detailed description.

The sensors 5G are respectively associated with the keys 2*a* and 2*b*. However, the sensors 5G are implemented by only the plunger position sensors 5*a*. For this reason, differentiators 9 are added between the plunger position sensors 5*a* and the multiplexers 10, and the current plunger velocity x' is supplied from the differentiators 9 to the multiplexers 10 and the differentiators 20.

The load applier 1Gb achieves all the advantages of the load applier 1*b*, and the logic circuits 6G are simpler than the logic circuits 6.

Although particular embodiments of the present invention have been shown and described, it will be apparent to those skilled in the art that various changes and modifications may be made without departing from the spirit and scope of the present invention.

For example, the keyboard musical instruments do not set any limit to the technical scope of the present invention. The electromechanical load applier 1*d*, 1Ad, 1Bd, 1Cd, 1Dd, 1Ed, 1Gd or 1Hd and mechanical load applier 3, 3A, 3B, 3C, 3D, 3E, 3G or 3H may be provided for a percussion instrument such as for a drum set or a foot pedal of a vibraphone or a pistons or keys of a wind instrument.

The mechanical load applier 3 may have weight pieces simply coupled to the black and white keys 2*a* and 2*b*. A coupling device may be provided between the keys 2*a* and 2*b* and the weight pieces so as to connect the weight pieces to and disconnected them from the keys 2*a* and 2*b*.

The cam rod 304*a* may be replaced with plural cam plates respectively associated with the keys 2*a* and 2*b*. In this instance, the mechanical load applier is adjustable for each of the black and white keys 2*a* and 2*b*.

The software implementation and hardware implementation are exchangeable with one another so that the functions shown in FIG. 5 may be as a whole implemented by software or wired logic circuits.

A dead zone may be defined between the numeral range of positive values of current plunger velocity x' and the numeral range of negative values of current plunger velocity x'. In this instance, even if the plungers 402 frequently change the direction within an extremely short time period, the central processing unit 101 keeps one of the inner force sense tables 30 and 31 for the extremely short time period, and the player feels the inner force sense natural.

The variable load mechanism 302A may be shared among all the hammers 300. In this instance, the mechanical load applier is simpler than the mechanical load applier 3A.

The bracket 303 may be movable in the longitudinal direction. In this instance, the bracket 303 is fitted to a movable block, and the movable block is held in threaded engagement with a feed screw. A guide rod passes through the movable block, and the feed screw is driven for rotation by a motor. The block and, accordingly, the bracket 303 are moved in the frontward direction and rearward direction depending upon the direction of rotation. Weight pieces are secured to the rear load portions of the hammers. The central processing unit 101 reads out the piece of load applier control data corresponding to the selected musical instrument, and controls the cam rod 304*a* and the bracket 303 so as to apply the inertial load appropriate to the selected musical instrument.

The coil spring 320 may be disconnected from the associated key 2*a* or 2*b*. In this instance, when the supporting plate 321 is found at the lowest position, the coil spring 320 is spaced from the associated key 2*a* or 2*b* at the rest position, and any elastic load is not applied to the key 2*a* or 2*b* during the downward movement. However, when the supporting plate 321 is changed to the uppermost position, the coil spring 320 is bought into contact with the associated key 2*a* or 2*b*. In this situation, while the associated key 2*a* or 2*b* is traveling toward the end position, the coil spring 320 applies the elastic load to the key 2*a* or 2*b* during the downward movement.

The supporting plate 321 may be shared among all of the black and white keys 2*a* and 2*b*, and the coil spring 320 may be replaced with another sort of spring or a resiliently deformable element.

The elastic load units of mechanical load applier 3B may be designed to be moved in the longitudinal direction. In this instance, the coil springs 320 are not connected to the black keys 2*a* and white keys 2*b*, and the supporting plates 321 are mounted on a movable plate (not shown). The cam rod 304*a* is removed from the mechanical load applier. However, the stepping motor is connected to the movable plate through a suitable mechanism such as a pinion-and-rack. The central processing unit 101 moves the movable plate in the frontward direction and rearward direction depending upon the selected sort of musical instrument so as to change the contact position between the coil springs 320 and the keys 2*a* and 2*b*. It is possible to vary the elastic load by changing the contact position between the coil spring 320 and the keys 2*a* and 2*b*.

The variable orifice unit 333 may be replaced with an orifice plate. In this instance, the cylinder 332 is closed with the orifice plate. In order to vary the viscous resistance, the rod 331 is disconnected from the associated key 2*a* or 2*b*, and a motor is connected to the cylinder 332 by means of a pinion-and-rack. When the player changes the selected sort of musical instrument, the central processing unit 101 causes the pulse generator to supply the driving signal to the motor. The cylinder 332 is moved in the longitudinal direction, and the contact position between the rod 331 and the associated key 2*a* or 2*b* is changed to an appropriate position.

A modification of fourth embodiment may have a mechanical load applier equivalent to the combination between the mechanical load applier 3/3A and one of the mechanical load appliers 3B and 3C. Another modification of forth embodiment may have a mechanical load applier equivalent to the combination of three sorts of mechanical load appliers 3/3A, 3B and 3C.

The function 37*a* may be carried out between the read-out of piece of inner force sense data Y3 and the function of addition 36.

The solenoid-operated actuators 4 do not set any limit to the technical scope of the present invention. Another sort of electric signal-to-force converter is available for the electromechanical load applier 1*d*, 1Ad, 1Bd, 1Cd, 1Dd and 1Ed. The sort of electric signal-to-force converter includes a linear motor, a rotary motor, a hydraulic motor, a hydraulic actuator, a pneumatic motor and a pneumatic actuator.

The bracket 303, cam rod 304*a* and stepping motor 304*b* do not set any limit to the technical scope of the present invention. Any sort of mechanism is available for the change between the activated state and the deactivated state. For example a motor and a brake may be provided for a rod, which offers an axis of rotation to the hammers 300. A coupling device may be provided between the keys 2*a* and 2*b* and the coil springs 320, and the keys 2*a* and 2*b* are connected to and disconnected from the springs 320 by means of the coupling device at the change between the activated state and the deactivated state.

The load applier 1*b*, 1Ab, 1Bb, 1Cb, 1Db and 1Eb may be assembled with keyboards for practical usage. The electronic tone generator 107 is not incorporated in the keyboards for practical usage, and trainees practice fingering on the keyboards without any tone.

An electronic keyboard musical instrument of the present invention may give rise to the inner force sense due to the rebound of hammers on the back checks. In detail, when the hammers are violently brought into collision with the strings in an acoustic piano, the hammers strongly rebound on the strings, and further rebound on the back checks. The rebound on back checks gives rise to vibrations of back checks, and the vibrations of back check give rise to inner force sense in the player. In order to give rise to the inner force sense due to the vibrations of back check, an inner force sense table is further prepared in the electronic system, and the central processing unit checks the key velocity to see whether or not the corresponding key of acoustic piano makes the hammers rebound on the back check. If the key velocity is larger than a threshold, the central processing unit reads out the piece of inner force sense data from the additional inner force sense table, and adds the read-out piece of inner force sense data to the sum of pieces of inner force sense data (Y1+Y2+Y3) after the timing at which the hammers are brought into collision with the back checks.

The pedal state may be taken into account. In an acoustic piano, when the player depresses the damper pedal, the inner force sense is different from that under the condition that the damper pedal is not depressed. In order to reflect the pedal state on the inner force sense, another set of inner force sense tables is prepared in the data storage facility of an electronic keyboard musical instrument of the present invention, and the central processing unit checks a pedal, which is corresponding to the damper pedal, to see whether or not the player depresses the pedal. When the player depresses the pedal, the central processing unit accesses the other sent of inner force sense tables, and give rise to the inner force sense in the player different from that without depressing the pedal.

The set of inner force sense tables 30, 31, 32 and 33 does not set any limit to the technical scope of the present invention. Another inner force sense table or tables may be further prepared for another combination or other combinations of the plunger position x, plunger velocity x' and plunger acceleration x'', or for any one of the plunger position x, plunger velocity x' and plunger acceleration x''. A constant may be added to the sum of pieces of inner force sense, and a change rate x''' of plunger acceleration x'' may be used for another inner force sense table. The change rage x''' deeply concerns the inner force sense so that pieces of inner force sense data expressing the change rate x''' make it possible to give rise to the inner force sense closer to that from an acoustic musical instrument in the player.

On the other hand, only one of the inner force sense tables 30/31, 32 and 33 may be stored in the data storage facility 104. In this instance, the black keys 2*a* and white keys 2*b* are monitored with only one sort of sensors, and pieces of inner force sense data are selectively read out from the inner force sense table. The read-out inner force sense data is supplied to the actuator control table for adjusting the driving signal to a suitable amount of mean current.

In the above-described embodiments, one of the inner force sense tables 30 and 31 is selected by using the direction of plunger velocity. However, this feature does not set any limit to the technical scope of the present invention. In yet another modification, the central processing unit 101 selects one of the inner force sense tables 30 and 31 on the basis of the acceleration x''.

Although the hysteresis in terms of the plunger position x is taken into account, hysteresis in terms of the plunger velocity x' and/or hysteresis in terms of the plunger acceleration x'' may be taken into account. In this instance, the inner force sense table 32 and/or 33 is replaced with a pair of and/or pairs of inner force sense tables. A dead zone may be introduced in the change of tables. In this instance, the inner force sense table of each pair may be changed to the other of the pair on under the condition that the current plunger velocity and/or current plunger acceleration keeps the positive sign or negative sign over the timer period equivalent to the dead zone. The dead zones may be different in length from one another.

In the above-described embodiments, the inner force sense tables 30 and 31 are selectively used for the pieces of inner force data Y1 depending upon the lapse of time from the change of sign of plunger velocity. However, the inner force sense tables 30 and 31 may be changed from one to another upon expiry of a predetermined time period from a predetermined timing such as, the initiation of depressing, a predetermined value of plunger position, a predetermined value of plunger velocity or a predetermined plunger acceleration.

Figure 13:
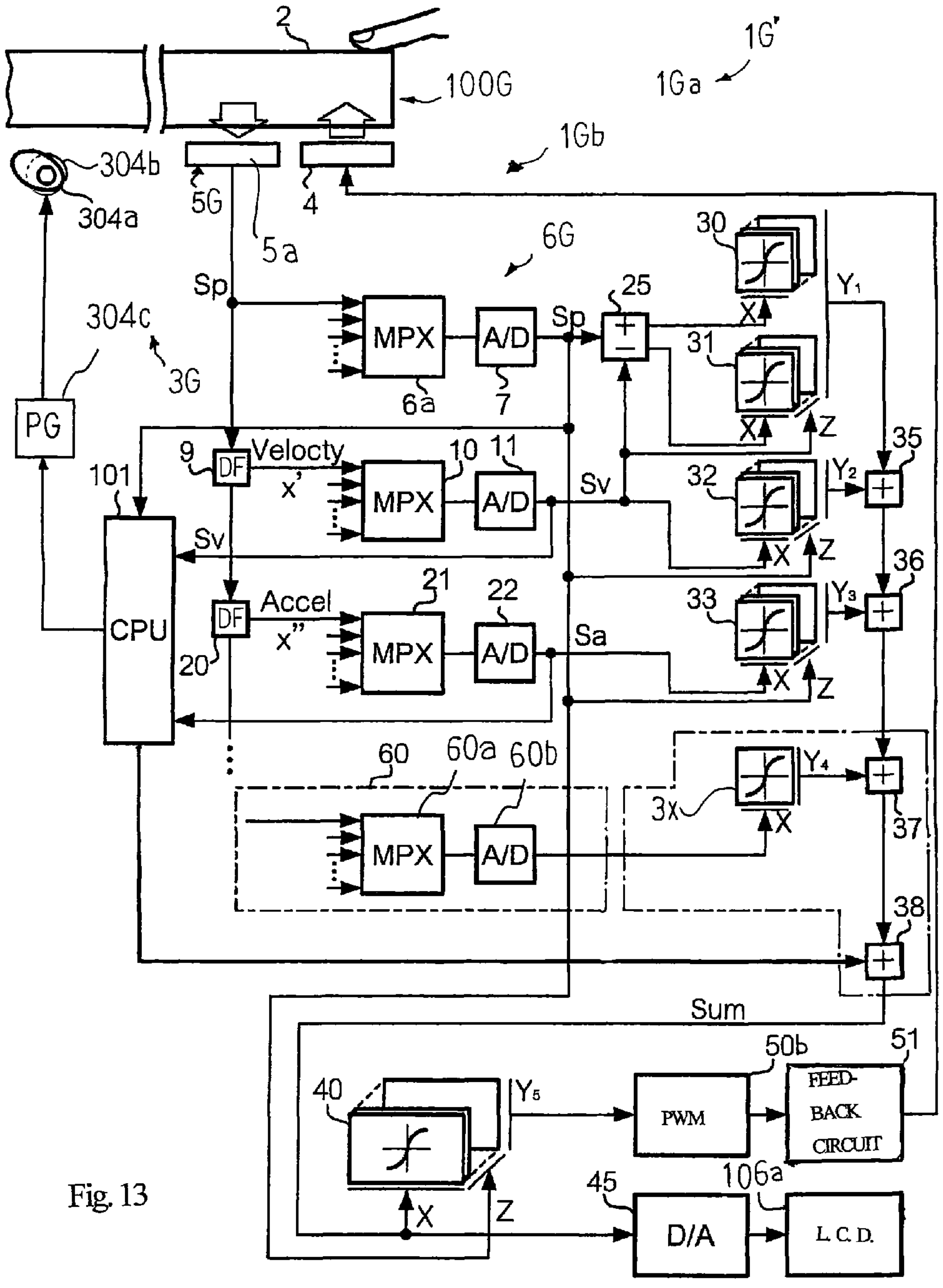
FIG. 13 is a block diagram showing the functions of an electromechanical load applier incorporated in a modification of the keyboard musical instrument of the present invention.

FIG. 13 shows a modification 1G' of the keyboard musical instrument 1G. As shown in the figure, logic circuits 60, i.e., multiplexers 60*a* and analog-to-digital converters 60*b* and functions 37 and 38 are added to the logic circuits 6G and functions shown in FIG. 12, and an inner force sense table 3*x* is further incorporated in the set of inner force sense tables 30/31, 32 and 33. The inner force sense table 3*x* has an only one plane, and a piece of inner force data Y4 is read out from the inner force sense table 3*x* with the plunger position x. The central processing unit 101 adds a piece of inner force data expressing the load due to the vibrations of back check to the sum of inner force sense data (Y1+Y2+Y3+Y4) through the function 38.

In case where the inner force sense due to the released keys is ignoreable, the electromechanical load applier 1*d*, 1Ad, 1Bd, 1Cd, 1Dd, 1Ed, 1Gd stands idle during the plunger motion toward the rest positions of associated keys.

The computer program may be downloaded from a suitable program source through the internet to the interface 108, or may be transferred from an information storage medium to the random access memory 103 through the interface 108.

The load applier 1*b*, 1Ab, 1Bb, 1Cb, 1Db, 1Eb or 1Gb may be installed in an automatic player keyboard musical instrument. While the automatic playing system is performing a music tune on the keyboard, any inner force sense is not required for the automatic playing system. For this reason, the mechanical load applier 3, 3A, 3B, 3C, 3D, 3E or 3G reduces the load as little as possible. This results in reduction in power consumption.

The keys 2*a* and 2*b* do not set any limit to the technical scope of the present invention. The load applier 1*b*, 1Ab, 1Bb, 1Cb, 1Db, 1Eb or 1Gb may give rise to the inner force sense during fingering on pedals of a musical instrument or a control manipulator of a mixer.

Figure 14:
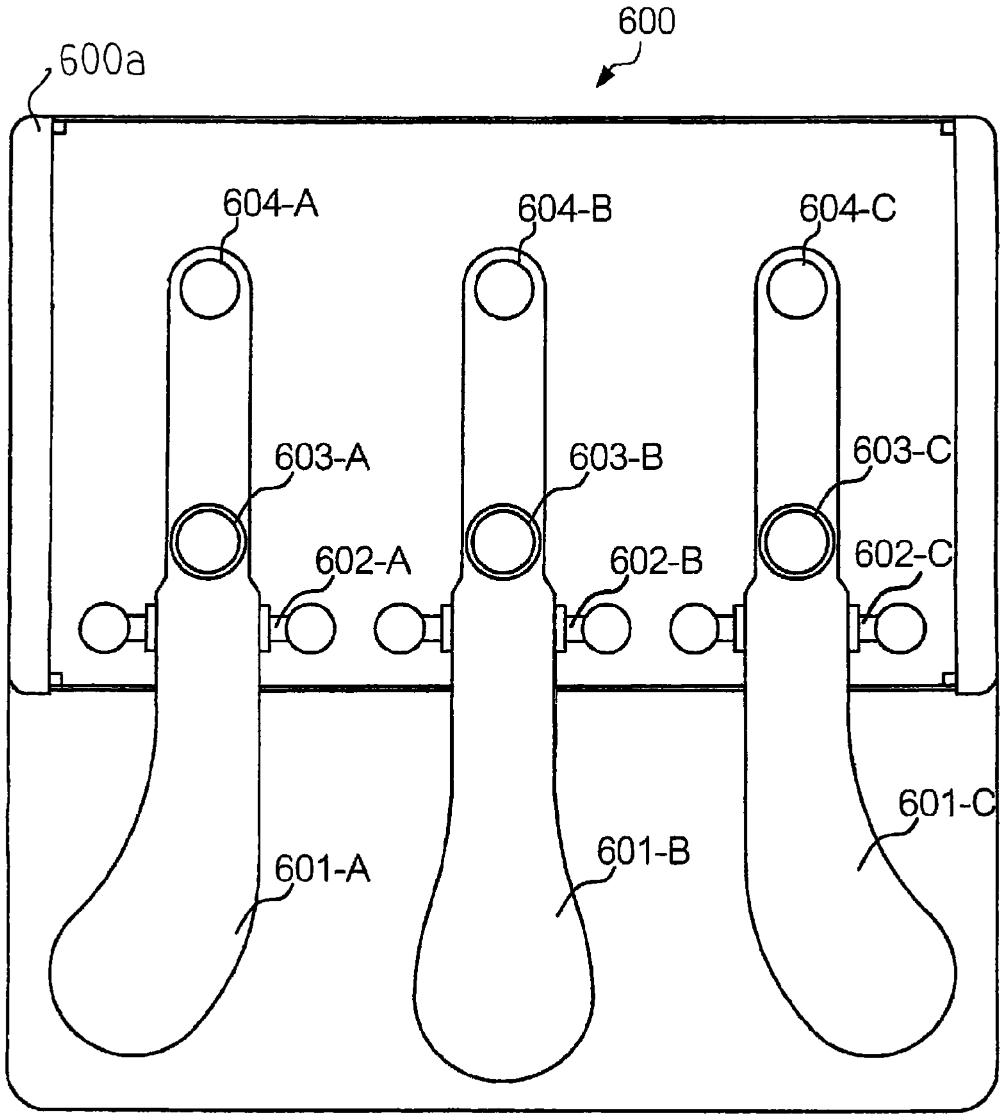
FIG. 14 is a plane view showing the structure of a pedal mechanism of an electronic keyboard and a load applier of the present invention.
Figure 15:
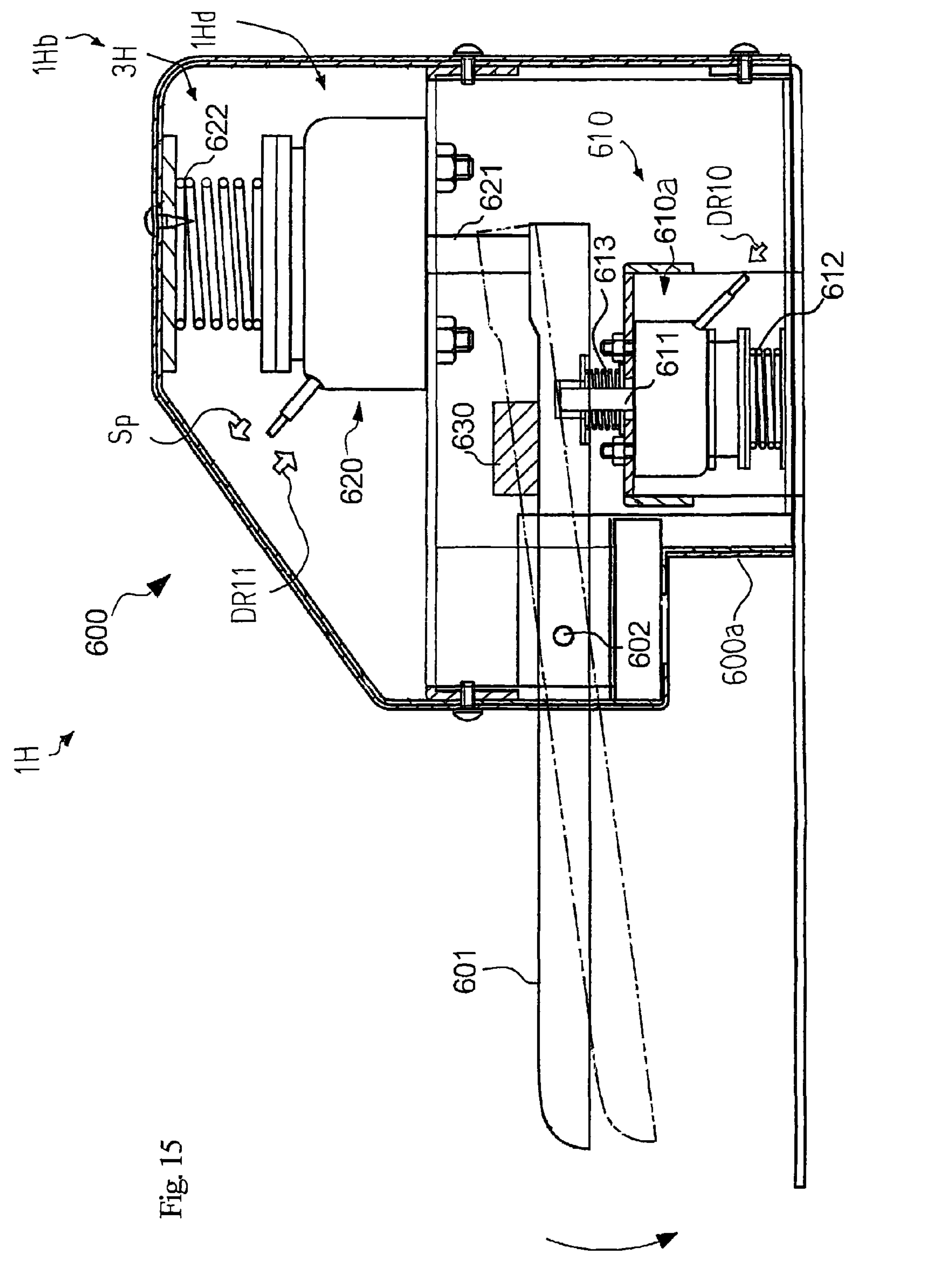
FIG. 15 is a cross sectional side view showing the structure of the pedal mechanism.

FIGS. 14 and 15 show a pedal mechanism 600 of an automatic player electronic keyboard musical instrument. The pedal mechanism 600 includes pedals 601-A, 601-B and 601-C, supporting structures 602-A, 602-B and 602-C and a housing 600*a*. Reference numeral 601 stands for all of the pedals 601-A, 601-B and 601-C, and reference numeral 602 stands for all of the supporting structures in FIG. 15, and these reference 601 and 602 are hereinafter used for all of the pedals and all of the supporting structures.

The supporting structures 602 are provided in the housing 600*a*, and the pedals 601 are rotatably supported by the housing 600*a* by means of the supporting structures 602.

The automatic player electronic keyboard musical instrument further includes an automatic player 610 and a load applier 1Hb. The automatic player 610 includes key actuators (not shown) for driving black keys and white keys (not shown), pedal actuators 610*a* for moving the pedals 601 and a controller (not shown). The pedal actuators 610*a* upwardly push the rear portions of associated pedals 601 with plungers 611. Double circles 603A, 603B and 603C are indicative of the locations of contact area between the plungers 611 and the pedals 601 in FIG. 14. Coil springs 612 are provided between the bottom portion of housing 600*a* and the pedal actuators 610*a*, and coil springs 613 are provided between the pedal actuators 610*a* and the pedals 601. These coil springs 612 and 613 prevent the pedals 601 from chattering, and enhance the stability of pedals in the automatic playing.

When a user requests the controller to perform a music tune without any fingering of a human player, music data codes are sequentially processed in the controller, and the controller selectively energizes the key actuators and pedal actuators 610*a* with driving signals DR10. The keys and pedal 601 are depressed and released as if a human player performs the music tune.

The load applier includes an electromechanical load applier 1Hd and a mechanical load applier 3H. The electromechanical load applier 1Hd includes actuators 620 with built-in plunger position sensors (not shown) and a controller (not shown), which is shared with the automatic player. The actuators 620 are responsive to driving signals DR11 so as to apply load to the associated pedals 601 with the plungers 621, and the built-in sensors (not shown) supply plunger position signals Sp to the controller (not shown). Circles 604-A, 604-B and 604-C are indicative of the location of contact areas between the plungers 621 and the pedals 601. The electromechanical load applier The mechanical load applier 3H includes coil springs 622, and the coil springs 622 are provided between the top panel of housing 600*a* and the pedal actuators 620. The coil springs 622 apply elastic load to the associated pedals 601.

Figure 16:
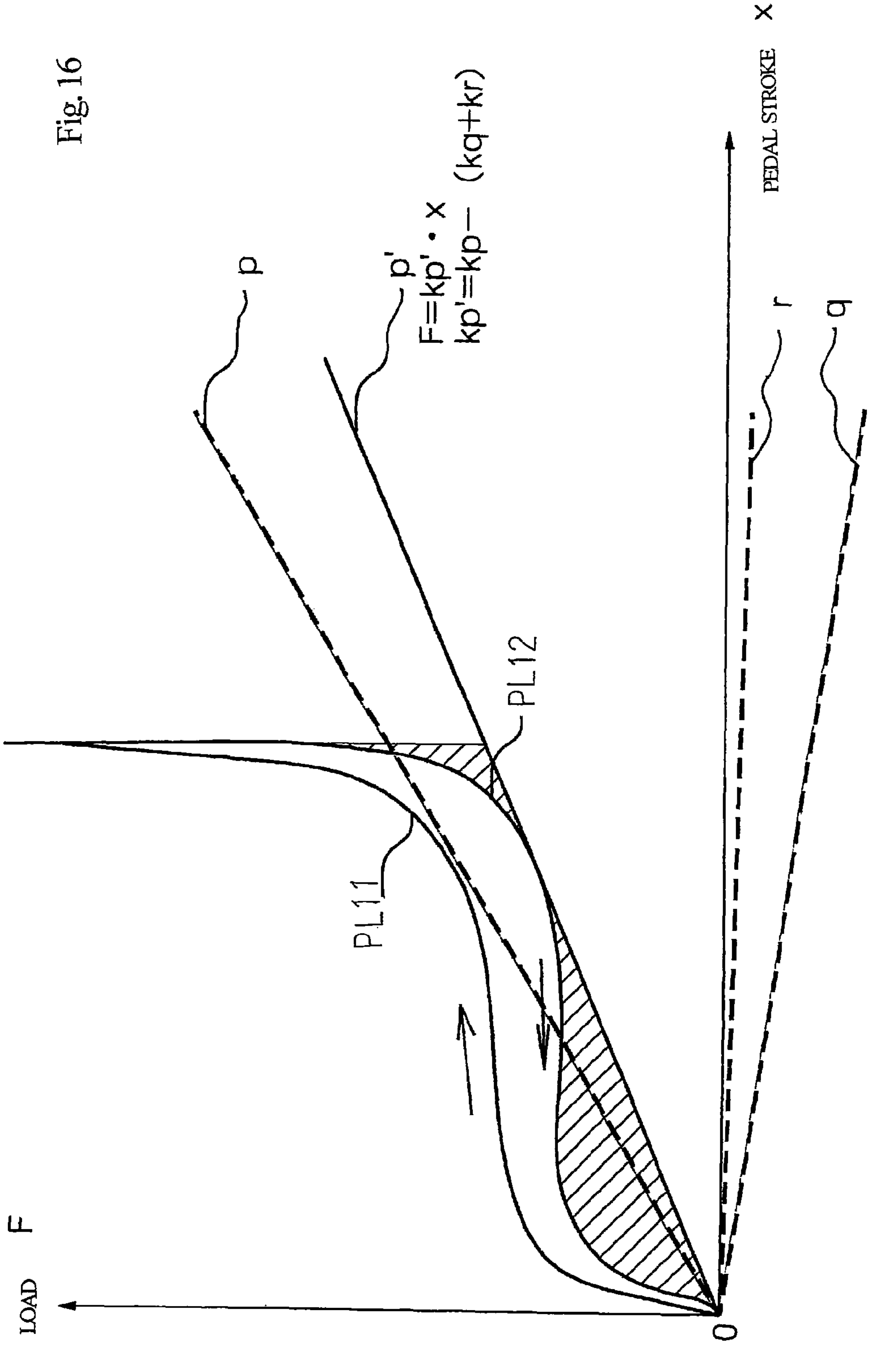
FIG. 16 is a graph showing pedal stroke-to-load characteristics of a damper pedal and elastic characteristics of coil springs.

The actuators 620 are reduced in size as follows. FIG. 16 shows stroke-to-load characteristics of one of the pedals 601 serving as the damper pedal of an acoustic piano, and the stroke-to-load characteristics are equivalent to the inner force sense given to the player through the pedal. Non-linear lines PL11 and PL12 stand for the stroke-to-load characteristics during the downward movement of the pedal and the stroke-to-load characteristics during the upward movement of the pedal, respectively. Linear lines q, r and p sands for the elastic characteristics of the coil springs 612, 613 and 622, and the spring constant of coil springs 612, 613 and 622 are expressed as kq, kr and kp, respectively. The elastic characteristics q, r and p are equivalent to elastic characteristics p'. The elastic characteristics p' are expressed as F=kp'×x, and kp'=kp−(kq+kr). The actuator 620 is expected to apply the difference between the non-linear lines PL11 and PL12 and the linear line p'. If any mechanical load applier is not incorporated, the electromechanical load applier 1Hd has to apply the load indicated by the non-linear lines PL11 and PL12. In this instance, the mechanical load applier 3H bears the load indicated by hatching lines in FIG. 16. The electromechanical load applier 1Hd has inner force sense tables expressing the load indicated by the hatching lines. Thus, the designer can reduce the actuators 620 in size by virtue of the mechanical load applier 3H.

Plural sets of inner force sense tables are prepared for the pedals 601, and the load applier 1Hb gives rise to the inner force sense equivalent to the selected sort of musical instrument in the player Reference numeral 630 designates weight pieces. In case where inertial load is mechanically applied to the pedals 601, the weight pieces 630 are respectively secured to the pedals 601. In case where viscous load is to be applied, the rod 331, piston 330, cylinder 332 and variable orifice unit 333 are provided for each of the pedals 601. The elastic load p' may be varied by the player through a suitable mechanism.

The system components and component parts of the musical instruments 1, 1A, 1B, 1C, 1D, 1E, 1G, 1G' and 1H are correlated with claim languages as follows.

The black keys 2*a* and white keys 2*b* serve as "manipulators", and the pedals 601-A, 601-B and 601-C also serve as the "manipulators". Each of the electromechanical load appliers 1*d*, 1Ad, 1Bd, 1Cd, 1Dd, 1Ed, 1Gd and 1Hd serves as a "first load applier". The plunger position sensors 5*a*, plunger velocity sensors 5*b* and logic circuits 6, 6G, 6G/60 as a whole constitute a "kinematical observer", and the plunger position x, plunger velocity, plunger acceleration x" and change rage of plunger acceleration x"' are "physical quantity". The solenoid-operated actuators 4 are corresponding to "actuators". The actuators 610*a* also serve as the "actuators". The data storage facility 104 and random access memory 103 form in combination a data holder. The central processing unit 102 and part of subroutine program for generating inner force sense, in which the functions 25/35/36 or 25/35/36/37/38 and read-out functions from the tables 30/31/32/33 are at least incorporated, serve as a "selector", and the central processing unit 101, subroutine program for generating inner force sense, in which the read-out function from table 40, pulse width modulator 50*b* and feedback circuit 51 serve as a "driver". Each of the mechanical load applier 3, 3A, 3B, 3C, 3D, 3E, 3G and 3H serves as a "second load applier".

The hammers 300, front acting portion 301, rear load portion 302 and bracket 303 form parts of an "inertial load generator", the hammers 300, front acting portion 301, variable load mechanism 302A and bracket 303 also form parts of the "inertial load generator".

The hammers 300 are corresponding to a "pole member", and a bracket 303 is corresponding to a "fulcrum member". Each of the rear load portion 302 and movable weight 310*b* serves as a "weight member".

The cam rod 304*a* and stepping motor 304*b* serve as a "state changer". The frame 310*a*, feed screw 311, motor 312 and rod 313 as a whole constitute a "load varying mechanism".

The coil springs 320 and supporting plate 321 form parts of an "elastic load generator", and the coil springs 320 are corresponding to an "elastic member". The coil springs 622 also form parts of the "elastic load generator".

The cylinders 322, rods 331, pistons 330 and variable orifice unit 333 form parts of a "viscous load generator". The cylinders 332 are corresponding to a "cylindrical member", and the rods 331 and pistons 330 form parts of a "movable member". The variable orifice unit 333 is corresponding to a "resistive member".

What is claimed is:

1. An inner force sense controlling apparatus for giving rise to inner force sense to a player through manipulators of a musical instrument, comprising:

a first load applier including

- a kinematical observer monitoring said manipulators and determining physical quantity expressing the movements of said manipulators,
- actuators respectively provided in association with said manipulators and responsive to driving signals representative of the amount of load to be applied directly to said associated manipulators so as give rise to a part of said inner force sense in said player,
- a data holder storing relations between said physical quantity and the amount of said load to be applied to said manipulators, and a controller having a selector connected to said kinematical observer and said data holder so as to specify the amount of said load to be applied on the basis of said physical quantity and a driver connected to said selector and said actuators so as to adjust said driving signals to values of magnitude corresponding to said load; and a second load applier connected to said manipulators, and having a mechanical load applier applying load directly to said manipulators in parallel to said actuators so as to give rise to another part of said inner force sense in said player and a mechanism for making said mechanical load applier stand idle in deactivate state.

2. The inner force sense controlling apparatus as set forth in claim 1, in which said mechanical load applier has an inertial load generator for applying inertial load directly to said manipulators.

3. The inner force sense controlling apparatus as set forth in claim 2, in which said inertial load applier has a pole member having one end portion connected to said manipulators, a fulcrum member connected to an intermediate portion of said pole member and a weight member connected to the other end portion of said pole member so that said inertial load is applied from said one end portion to said manipulators due to said weight member.

4. The inner force sense controlling apparatus as set forth in claim 2, in which said mechanism has a state changer provided in association with the inertial load generator so as to change said inertial load generator between activated state for applying said inertial load to said manipulators and said deactivated state for prohibiting said inertial load generator from applying said inertial load to said manipulators.

5. The inner force sense controlling apparatus as set forth in claim 2, in which said second load applier further has a load varying mechanism making said amount of said inertial load varied.

6. The inner force sense controlling apparatus as set forth in claim 1, in which said mechanical load applier includes at least two generator selected from the group consisting of an inertial load generator for applying inertial load directly to said manipulators, an elastic load generator for applying elastic load directly to said manipulators, and a viscous load generator for applying viscous load directly to said manipulators.

7. The inner force sense controlling apparatus as set forth in claim 6, in which said mechanism includes state changers provided in association with said at least two generators, respectively, so as independently to change said at least two generators between activated state for applying the load to said manipulators and said deactivated state for independently prohibiting said at least two generators from applying said load to said manipulators.

8. A musical instrument comprising:

plural manipulators selectively moved between rest positions and end positions by a player for specifying tones to be produced; and an inner force sense controlling apparatus including a first load applier including a kinematical observer monitoring said manipulators and determining physical quantity expressing the movements of said manipulators, actuators respectively provided in association with said manipulators and responsive to driving signals representative of the amount of load to be applied directly to said associated manipulators so as give rise to a part of said inner force sense in said player, a data holder storing relations between said physical quantity and the amount of said load to be applied to said manipulators and a controller having a selector connected to said kinematical observer and said data holder so as to specify the amount of said load to be applied on the basis of said physical quantity and a driver connected to said selector and said actuators so as to adjust said driving signals to values of magnitude corresponding to said load, and a second load applier connected to said manipulators, and having a mechanical load applier for applying load directly to said manipulators in parallel to said actuators so as to give rise to another part of said inner force sense in said player and a mechanism for making said mechanical load applier stand idle in deactivate state.

9. The musical instrument as set forth in claim 8, in which said manipulators are keys selectively depressed and released for specifying the pitch of said tones.

10. The musical instrument as set forth in claim 8, further comprising a tone generator connected to said plural manipulators and generating said tones.

11. The musical instrument as set forth in claim 8, in which said mechanical load applier includes at least one generator selected from the group consisting of an inertial load generator for applying inertial load directly to said manipulators, an elastic load generator for applying elastic load directly to said manipulators, and a viscous load generator for applying viscous load directly to said manipulators.

12. The musical instrument, as set forth in claim 11, in which a state changer is provided in association with said at least one generator so as to change said at least one generator between activated state for applying the load to said manipulators and said deactivated state for prohibiting said at least two generators from applying said load to said manipulators.

13. A method for giving rise to inner force sense to a player through manipulators of a musical instrument, comprising the steps of:

a) changing a mechanical load applier between activated state and deactivated state;

b) determining physical quantity expressing a movement of at least one of said manipulators;

c) determining the amount of load to be applied to said at least one of said manipulators at said physical quantity;

d) adjusting a driving signal to a value of magnitude corresponding to said load to be applied; and e) supplying said driving signal to an actuator of a load applier directly connected to said at least one of said manipulators so that said actuator gives rise to said inner force sense in said player through said load applier together with said mechanical load applier connected directly to said at least one of said manipulators in parallel to said actuator of said load applier in said activated state or without said mechanical load applier in said deactivated state.

14. The method as set forth in claim 13, in which said mechanical load applier includes at least one generator selected from the group consisting of an inertial load generator for applying inertial load directly to said manipulators, an elastic load generator for applying elastic load directly to said manipulators, and a viscous load generator for applying viscous load directly to said manipulators.

* * * * *